(12) United States Patent
Shimada et al.

(10) Patent No.: US 11,470,395 B2
(45) Date of Patent: Oct. 11, 2022

(54) CONTENT DISTRIBUTION SYSTEM AND CONTENT DISTRIBUTION METHOD

(71) Applicant: SONY CORPORATION, Tokyo (JP)

(72) Inventors: Hirofumi Shimada, Tokyo (JP); Masako Komuro, Tokyo (JP); Kouji Ogawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,737

(22) PCT Filed: Aug. 23, 2019

(86) PCT No.: PCT/JP2019/032992
§ 371 (c)(1),
(2) Date: Feb. 26, 2021

(87) PCT Pub. No.: WO2020/050058
PCT Pub. Date: Mar. 12, 2020

(65) Prior Publication Data
US 2021/0352344 A1 Nov. 11, 2021

(30) Foreign Application Priority Data
Sep. 7, 2018 (JP) .............................. JP2018-167784

(51) Int. Cl.
*H04N 21/4728* (2011.01)
*H04N 21/2343* (2011.01)
(Continued)

(52) U.S. Cl.
CPC . *H04N 21/4728* (2013.01); *H04N 21/234345* (2013.01); *H04N 21/234363* (2013.01);
(Continued)

(58) Field of Classification Search
CPC ....... H04N 21/4728; H04N 21/234363; H04N 21/23439; H04N 21/6175; H04N 19/167;
(Continued)

(56) References Cited

U.S. PATENT DOCUMENTS 9,691,358 B2 * 6/2017 Park ................. H04N 21/41407
2012/0002111 A1 * 1/2012 Sandoval ................. H04N 5/06
348/521

(Continued)

FOREIGN PATENT DOCUMENTS

CN 109074628 A 12/2018
EP 3062523 A1 8/2016
(Continued)

OTHER PUBLICATIONS

International Search Report and Written Opinion of PCT Application No. PCT/JP2019/032992, dated Sep. 24, 2019, 12 pages of ISRWO.

*Primary Examiner* — Gregory Todd
(74) *Attorney, Agent, or Firm* — Chip Law Group

(57) ABSTRACT

The present disclosure relates to a content distribution system and a content distribution method capable of improving a user experience of a user who views content. A distribution server distributes content in which a plurality of high-definition partial images and a low-resolution entire image including those partial images as regions are hierarchically configured. Then, a mobile display device displays the entire image and displays the partial image in a selectable manner on the entire image, and operation of selecting a predetermined partial image is performed. On the other hand, a large screen display device displays the partial images distributed from the distribution server in high definition according to operation on the mobile display device.

10 Claims, 22 Drawing Sheets

(51) Int. Cl.
*H04N 21/43* (2011.01)
*H04N 21/242* (2011.01)
*H04N 21/41* (2011.01)
*H04N 21/2662* (2011.01)

(52) U.S. Cl.
CPC ....... *H04N 21/242* (2013.01); *H04N 21/4122* (2013.01); *H04N 21/4307* (2013.01); *H04N 21/23439* (2013.01); *H04N 21/234381* (2013.01); *H04N 21/2662* (2013.01); *H04N 21/4302* (2013.01)

(58) Field of Classification Search
CPC ....... H04N 21/234381; H04N 21/2356; H04N 21/4302; H04N 21/4122; H04N 21/242; H04N 21/4305; H04N 21/4307–43079; G06F 3/14; G06F 1/1645–165
See application file for complete search history.

(56) References Cited

U.S. PATENT DOCUMENTS

| | | | |
|---|---|---|---|
| 2012/0147799 A1* | 6/2012 | Nagara | H04N 21/440263 370/310 |
| 2014/0195651 A1* | 7/2014 | Stockhammer | H04N 21/242 709/219 |
| 2016/0156950 A1* | 6/2016 | Bangma | H04N 21/43 725/116 |
| 2016/0165309 A1* | 6/2016 | Van Brandenburg | H04N 21/64322 725/116 |
| 2016/0269759 A1 | 9/2016 | Watanabe et al. | |
| 2017/0155912 A1* | 6/2017 | Thomas | H04L 67/02 |
| 2017/0201689 A1* | 7/2017 | Zilberman | H04N 1/3935 |
| 2019/0108611 A1 | 4/2019 | Izumi | |

FOREIGN PATENT DOCUMENTS

| | | |
|---|---|---|
| EP | 3457352 A1 | 3/2019 |
| JP | 09-163344 A | 6/1997 |
| JP | 2014-150408 A | 8/2014 |
| JP | 2016-116143 A | 6/2016 |
| KR | 10-2019-0008193 A | 1/2019 |
| WO | 2015/060165 A1 | 4/2015 |
| WO | 2016/199608 A1 | 12/2016 |
| WO | 2017/195650 A1 | 11/2017 |
| WO | 2018/139073 A1 | 8/2018 |

* cited by examiner

FIG. 5

| CONTENT DESIGNATION INFORMATION | MANIFEST FILE ID (index, URL, etc) |
|---|---|

| ENTIRE IMAGE REQUEST | ENTIRE IMAGE FILE ID (index, URL, etc) |
|---|---|

| PARTIAL IMAGE REQUEST | PARTIAL IMAGE FILE ID (index, URL, etc) |
|---|---|

| REPRODUCTION CONTROL INFORMATION | CONTROL INFORMATION (PLAY or END) |
|---|---|

| DIRECTION AND VISUAL FIELD SELECTION INFORMATION | DIRECTION (Yaw, Pitch, Roll) | VISUAL FIELD (HORIZONTAL ANGLE, VERTICAL ANGLE) |
|---|---|---|

| SYNCHRONIZATION INFORMATION | REAL TIME t | REPRODUCTION REFERENCE TIME AT t $T_{play}(t)$ | REPRODUCTION REFERENCE TIME SPEED AT t $\Delta T_{play}(t)$ | CONTROL INFORMATION Direction | LINE-OF-SIGHT DIRECTION AND VISUAL FIELD ViewDir/FoV | VARIOUS REPRODUCTION INCIDENTAL INFORMATION Various Playback Conditions |
|---|---|---|---|---|---|---|

CONTENT DISTRIBUTION SYSTEM AND CONTENT DISTRIBUTION METHOD

CROSS REFERENCE TO RELATED APPLICATIONS

This application is a U.S. National Phase of International Patent Application No. PCT/JP2019/032992 filed on Aug. 23, 2019, which claims priority benefit of Japanese Patent Application No. JP 2018-167784 filed in the Japan Patent Office on Sep. 7, 2018. Each of the above-referenced applications is hereby incorporated herein by reference in its entirety.

TECHNICAL FIELD

The present disclosure relates to a content distribution system, a content distribution method, and a program, and in particular, a content distribution system, a content distribution method, and a program capable of improving a user experience of a user who views content in which a plurality of partial images and an entire image including those partial images as regions are hierarchically configured.

BACKGROUND ART

Conventionally, content is distributed in which an entire image such as an omnidirectional or omniazimuth image or a panoramic image is reproduced, and a display region of the entire image is moved or switched according to user's operation, so that high-definition partial images hierarchically arranged with respect to a part of the entire image are displayed.

For example, in a case of reproducing such content on a mobile display device, it is possible to perform operation on the content such as moving the display region of the entire image quickly and easily by using inertial measurement unit (IMU) interlocking or a touch panel, or displaying a desired partial image. However, since the display angle of view of the mobile display device is narrow, it is difficult to obtain a sufficient realistic feeling. On the other hand, in a case where a large screen display device such as a television receiver or a projector is used as the content display device, the content can be displayed with a sufficient display angle of view, but it is difficult to easily perform operation on the content.

For example, Patent Document 1 discloses an information processing system that distributes, to a moving image reproduction terminal, a coded stream in which a low-resolution omnidirectional image is encoded and a coded stream in which each divided image acquired by dividing a high-resolution omnidirectional image are independently encoded.

CITATION LIST

Patent Document

Patent Document 1: International Publication No. 2016/199608

SUMMARY OF THE INVENTION

Problems to be Solved by the Invention

As described above, there is concern that, for reproducing content for which the entire image and the partial image are prepared, the realistic feeling is reduced in a case of using a mobile display device, and the operability on the content is reduced in a case of using a large screen display device. Accordingly, it is necessary to improve the user experience by making it possible for the user who views content to experience a sufficient realistic feeling and to obtain preferable operability on the content.

The present disclosure has been made in view of such a situation, and enables improvement of a user experience of a user who views content in which a plurality of partial images and an entire image including those partial images as regions are hierarchically configured.

Solutions to Problems

A content distribution system of an aspect of the present disclosure includes: a distribution server that distributes content in which a plurality of high-definition partial images and a low-resolution entire image including the plurality of partial images as regions are hierarchically configured; a first display device that displays the entire image, and displays the partial images in a selectable manner on the entire image, so that operation of selecting a predetermined partial image of the partial images is performed; and a second display device that displays the partial images distributed from the distribution server in high definition according to the operation on the first display device.

A content distribution method or program of an aspect of the present disclosure includes: distributing content in which a plurality of high-definition partial images and a low-resolution entire image including the plurality of partial images as regions are hierarchically configured; displaying the entire image, and displaying the partial images in a selectable manner on the entire image, so that operation of selecting a predetermined partial image of the partial images is performed; and displaying the partial images distributed according to the operation in high definition.

In an aspect of the present disclosure, content is distributed in which a plurality of high-definition partial images and a low-resolution entire image including the plurality of partial images as regions are hierarchically configured. Then, the entire image is displayed, the partial image is displayed in a selectable manner on the entire image, operation of selecting a predetermined partial image is performed, and the partial image distributed according to the operation is displayed in high definition.

BRIEF DESCRIPTION OF DRAWINGS

FIG. 5 is a diagram showing an example of each piece of information transmitted and received.

MODE FOR CARRYING OUT THE INVENTION

Specific embodiments to which the present technology is applied will be described in detail below with reference to the drawings.

<First Configuration Example of Content Distribution System>

Figure 1:
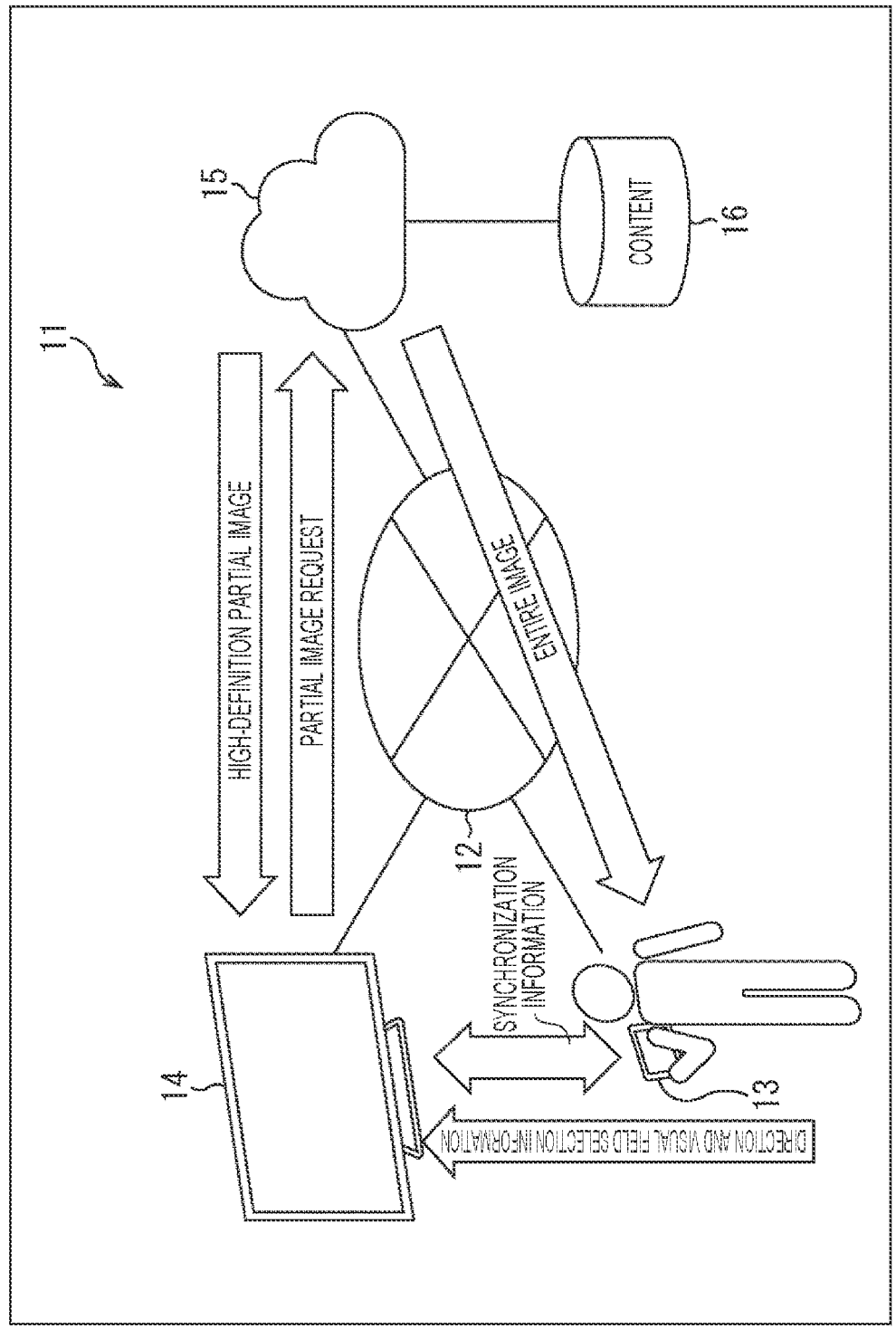
FIG. 1 is a block diagram showing a configuration example of a content distribution system according to a first embodiment to which the present technology is applied.

FIG. 1 is a block diagram showing a configuration example of a content distribution system according to a first embodiment to which the present technology is applied.

The content distribution system 11 shown in FIG. 1 is configured by connecting a mobile display device 13, a large screen display device 14, and a distribution server 15 via a network 12, and a content storage unit 16 is connected to the distribution server 15. Then, in the content distribution system 11, content is distributed in which a plurality of partial images and an entire image including those partial images as regions are hierarchically configured.

The mobile display device 13 is, for example, a small portable display device including a touch panel display capable of displaying an image and to which user's touch operation can be input. Furthermore, the mobile display device 13 can directly perform wireless communication with the large screen display device 14, and can also perform communication with the distribution server 15 via the network 12. For example, the mobile display device 13 can display only the entire image or display an image (for example, the selection screen of FIG. 3 as described later) in which a characteristic difference is added to the region corresponding to the partial image on the entire image. Then, the user can perform operation on the mobile display device 13 to specify a desired partial image and display the partial image.

For example, the large screen display device 14 is a large-sized display device capable of displaying high-definition images, can directly perform wireless communication with the mobile display device 13, and can perform communication with the distribution server 15 via the network 12. For example, the large screen display device 14 can hold both the entire image and the plurality of partial images as different pieces of image data, and, for example, can display the partial image that the user designates by performing operation on the mobile display device 13.

The distribution server 15 includes a plurality of server groups connected to the network 12, and provides a service for distributing the content read from the content storage unit 16 on the network 12. For example, the distribution server 15 can transmit the entire image to the mobile display device 13 or the partial image to the large screen display device 14.

The content storage unit 16 stores the content distributed in the content distribution system 11. The content stored in the content storage unit 16 includes, for example, a low-resolution entire image and a high-resolution partial image divided and hierarchically layered, and has a manifest in which various types of information necessary for controlling distribution the images are described.

The content distribution system 11 is configured as described above, and the entire image is distributed from the distribution server 15 to the mobile display device 13, so that the user can select the partial image to be displayed on the large screen display device 14 while viewing the entire image displayed on the mobile display device 13. Therefore, the mobile display device 13 transmits direction and visual field selection information indicating the direction and visual field of the partial image selected by the user to the large screen display device 14, and the large screen display device 14 transmits a partial image request requesting the distribution of the partial image to the distribution server 15 on the basis of the direction and visual field selection information.

Then, the distribution server 15 can read the high-definition partial image from the content storage unit 16 and transmit the partial image to the large screen display device 14 in response to the partial image request, and the partial image is displayed on the large screen display device 14. Furthermore, the mobile display device 13 and the large screen display device 14 can transmit and receive synchronization information to each other so as to synchronize the reproduction of images with each other.

Accordingly, the content distribution system 11 can provide the user with preferable operability using the mobile display device 13 and sufficient realistic feeling by the large screen display device 14, and improve a user experience of the user who views the content.

Here, a configuration example of the content distributed by the content distribution system 11 will be described with reference to FIGS. 2A and 2B.

Figure 2A:
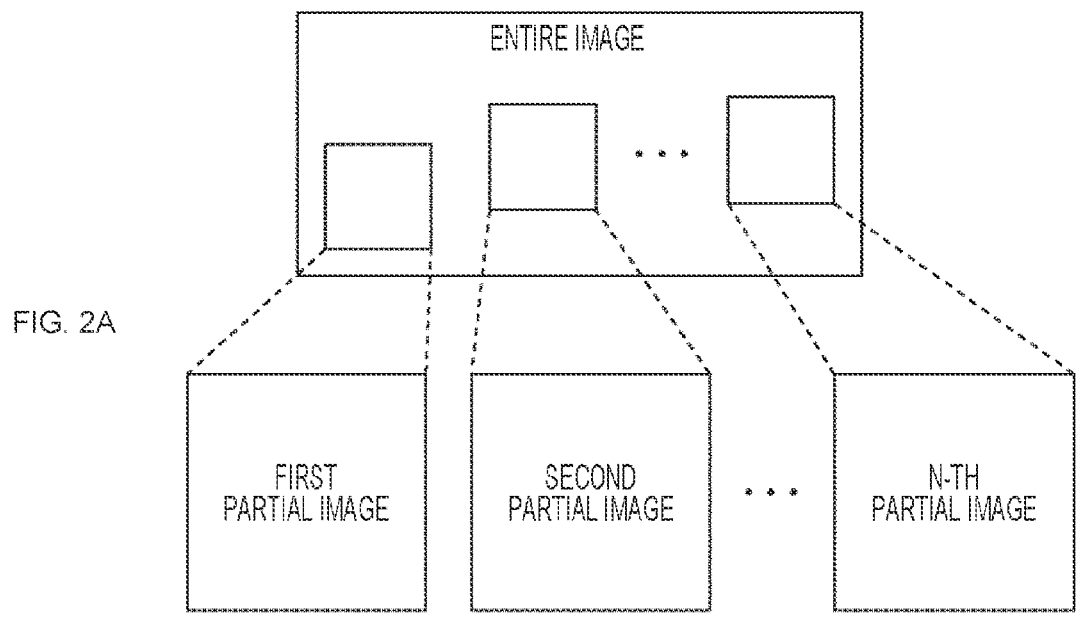
FIGS. 2A and 2B are diagrams showing a configuration example of content.

As shown in FIG. 2A, for example, the content includes an entire image in which a wide region such as an omnidirectional image or a panoramic image is projected at a low resolution, and a plurality of partial images in which parts of the wide region are projected at a high resolution. Here, an example of content in which N partial images from the first to the Nth are prepared for one entire image is shown.

Figure 2B:
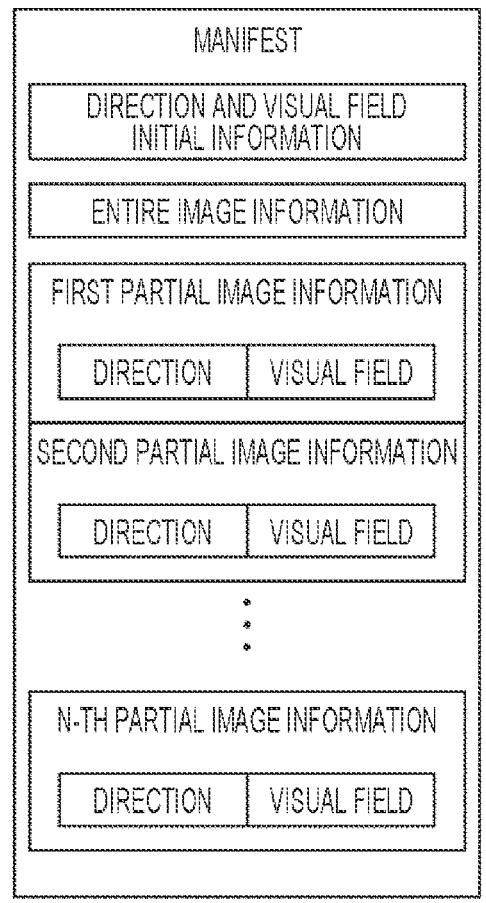

As shown in FIG. 2B, the manifest includes direction and visual field initial information, entire image information, and partial image information from the first to the Nth.

The direction and visual field initial information includes, for example, information indicating the direction of the line-of-sight and the visual field selected in the initial state when the reproduction of the content is started. For example, the direction and visual field initial information can correspond to the line-of-sight direction and visual field of any one of the N partial images.

The entire image information includes, for example, information for designating the entire image.

The partial image information includes, for example, information for designating individual partial images and information indicating the direction of the line-of-sight and the visual field representing the region covered (coverage) on the entire image by each partial image.

Then, in the content distribution system 11, the mobile display device 13 can generate a selection screen in which characteristic image processing is performed on a region where a plurality of partial images exists on the entire image according to the manifest, and display the selection screen on the touch panel display. The mobile display device 13 displays the partial images on the selection screen so that they can be selected, and the user can select the partial images to be displayed on the large screen display device 14 while viewing the selection screen of the mobile display device 13.

Figure 3:
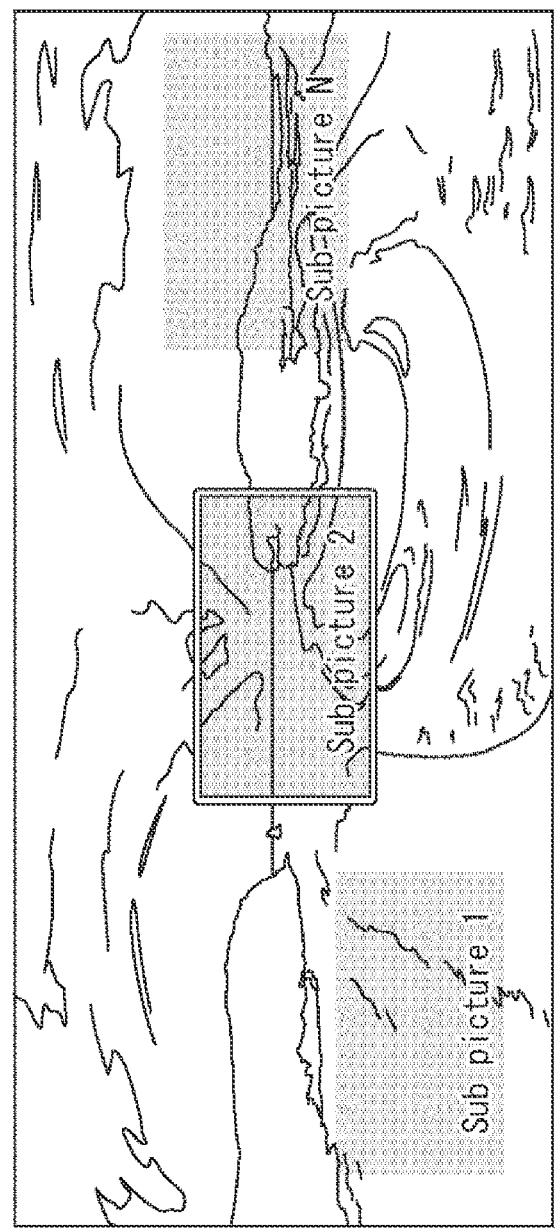
FIG. 3 is a diagram showing an example of a selection screen.

An example of the selection screen displayed on the mobile display device 13 will be described with reference to FIG. 3.

For example, the mobile display device 13 reduces the entire image according to the display size of the touch panel display, designates the region where each partial image exists as the superimposition position according to the individual partial image information, reduces the size of the partial image, and superimpose the images. In the example shown in FIG. 3, the region where the partial image exists is represented by light gray hatching, and in actual, characteristic image processing such as changing the brightness is performed.

Furthermore, in the selection screen displayed on the mobile display device 13, a selection frame (double frame line in the example shown in FIG. 3) representing the selection state of the partial image selected to be displayed on the large screen display device 14 among the plurality of partial images is displayed so as to surround the partial image. For example, the user can select a partial image by touching operation on the touch panel display of the mobile display device 13, and when the selection of the partial image to be displayed on the large screen display device 14 is changed, a selection frame is displayed for the newly selected partial image. Note that, in the initial state when the reproduction of the content is started, for example, a selection frame is displayed for the partial image corresponding to the direction of the line-of-sight and the visual field indicated by the direction and visual field initial information in FIGS. 2A and 2B.

The display angle of view of the partial image will be described with reference to FIG. 4.

Figure 4:
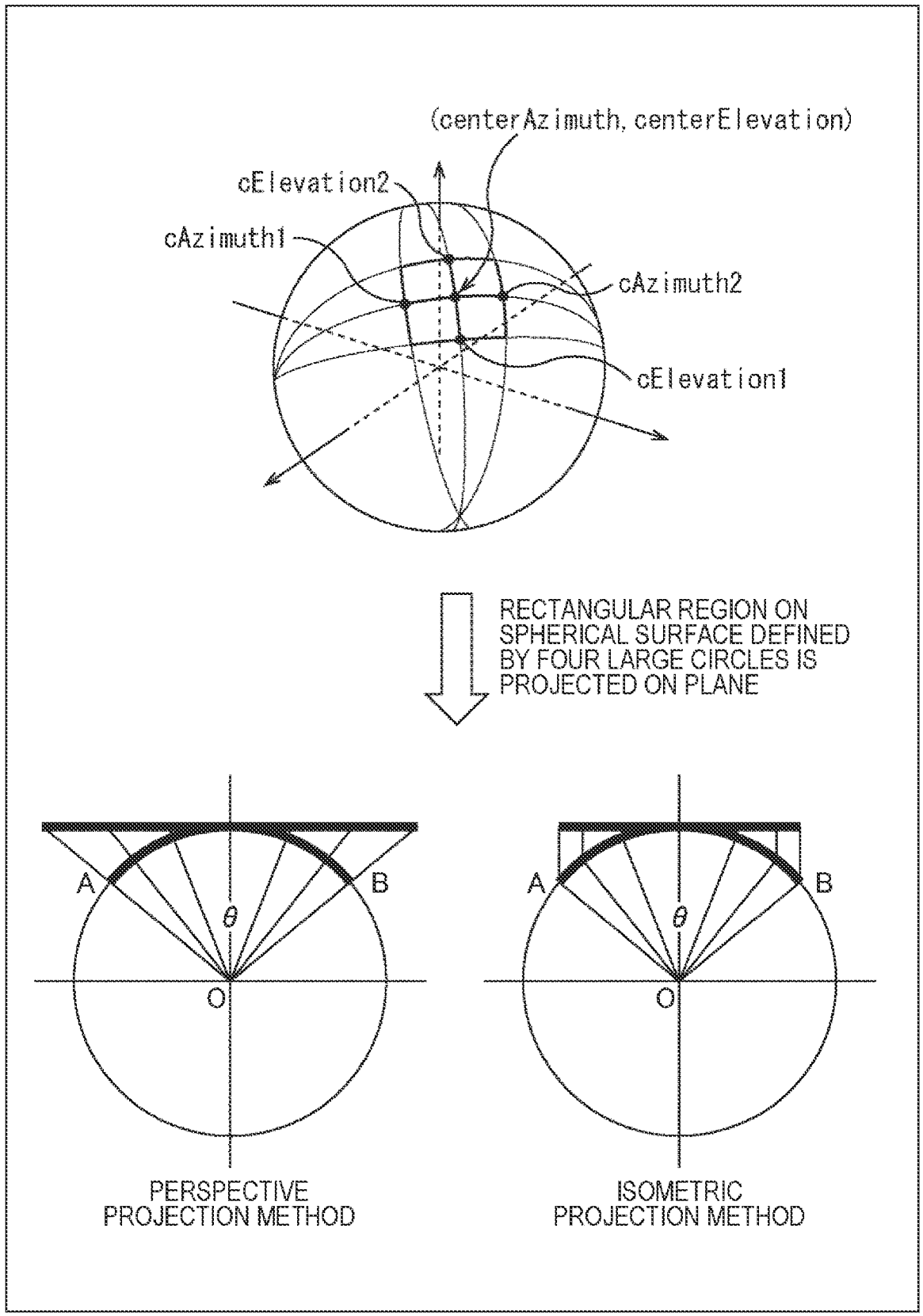
FIG. 4 is a diagram for explaining a display angle of view.

For example, when a partial image is cut out from the entire image, a rectangular region on a spherical surface defined by four great circles is projected on a plane as shown in the upper part of FIG. 4. Then, the angle cut out on this spherical surface (the arc AOB shown on the lower part of FIG. 4) is the display angle of view of the partial image. At this time, even if the display angle of view is the same, the plane size differs depending on the projection method. For example, the plane size in the perspective projection method is wider than the plane size in the isometric projection method.

FIG. 5 shows an example of information transmitted/received in the content distribution system 11.

Content designation information is used when designating content to be distributed from the distribution server 15. For example, the content designation information includes a manifest file identification (ID) that can identify a file in which a manifest of the content is recorded, and an index, a uniform resource locator (URL), or the like is used as the manifest file ID.

An entire image request is used when requesting the distribution server 15 to distribute an entire image. For example, the entire image request includes an entire image file ID that can identify a file in which the entire image is recorded, and an index, a URL, or the like is used as the entire image file ID.

A partial image request is used when requesting the distribution server 15 to distribute a partial image. For example, the partial image request includes a partial image file ID that can identify a file in which the partial image is recorded, and an index, a URL, or the like is used as the partial image file ID.

Reproduction control information is used when controlling the reproduction of an image. For example, the reproduction control information includes control information (PLAY) for giving an instruction for the start of image reproduction or control information (END) for giving an instruction for the end of image reproduction.

The direction and visual field selection information is used when the mobile display device 13 notifies the large screen display device 14 of the partial image selected by the user. For example, the direction and visual field selection information includes information that designates the direction of the line-of-sight (yaw, pitch, roll) and information that specifies the visual field (horizontal angle, vertical angle).

The synchronization information is used to synchronize the images reproduced on the mobile display device 13 and the large screen display device 14, and includes, for example, real time t and reproduction incidental information. Then, the reproduction incidental information includes reproduction reference time $T_{Play}(t)$ at the real time t, reproduction reference time speed $\Delta T_{Play}(t)$ at real time t, control information Direction, line-of-sight direction and visual field ViewDir/FOV, and other reproduction incidental information Various Playback Conditions.

Figure 6:
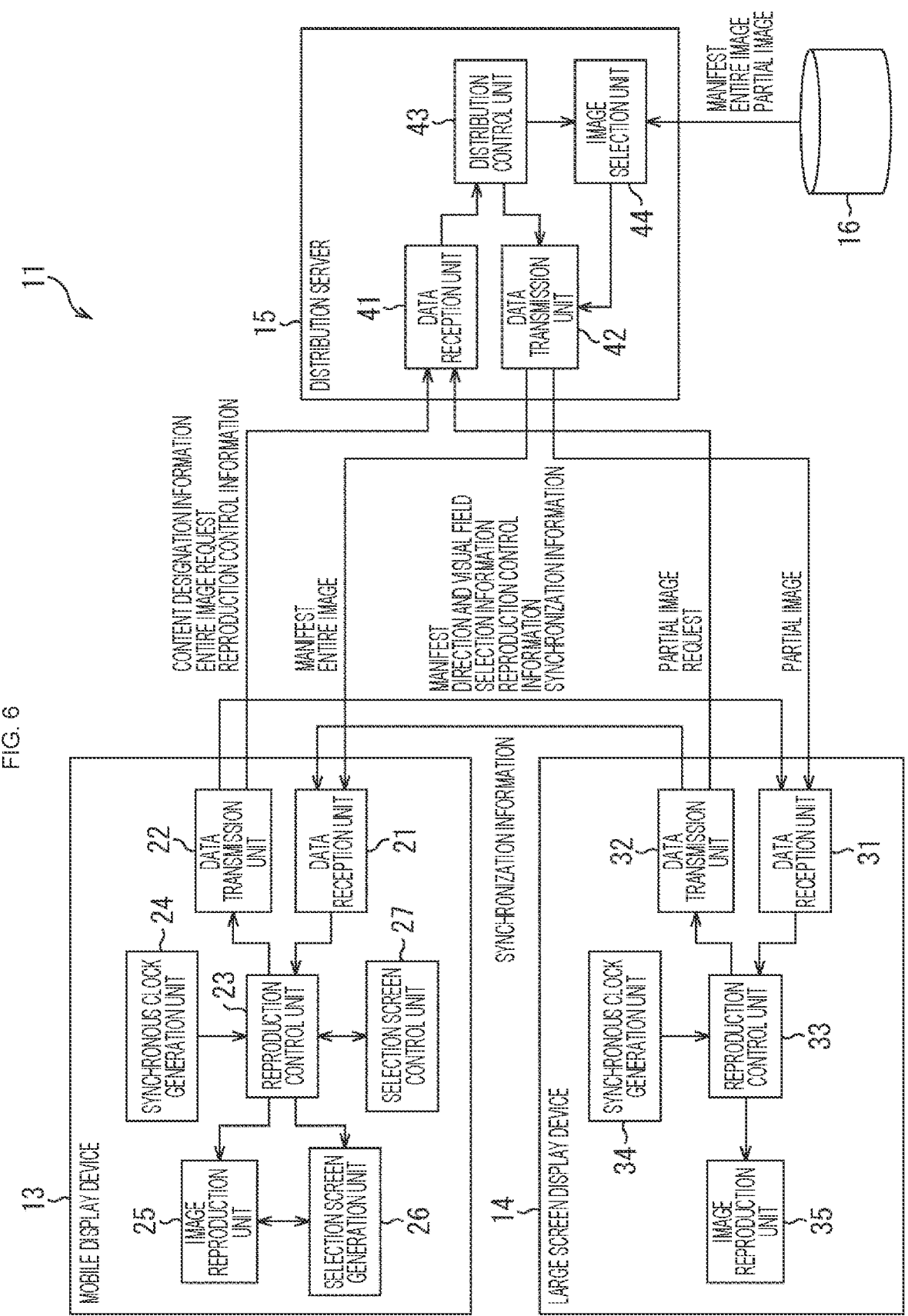
FIG. 6 is a detailed block diagram showing a configuration example of the content distribution system of FIG. 1.

FIG. 6 shows a block diagram for explaining the content distribution system 11 shown in FIG. 1 in detail.

The mobile display device 13 includes a data reception unit 21, a data transmission unit 22, a reproduction control unit 23, a synchronous clock generation unit 24, an image reproduction unit 25, a selection screen generation unit 26, and a selection screen control unit 27.

The data reception unit 21 receives various types of data transmitted from the large screen display device 14 or the distribution server 15 and supplies the data to the reproduction control unit 23. For example, the data reception unit 21 receives the synchronization information transmitted from the large screen display device 14, and receives the manifest, the entire image, and the like transmitted from the distribution server 15.

The data transmission unit 22 transmits various types of data to the large screen display device 14 or the distribution server 15 under the control of the reproduction control unit 23. For example, the data transmission unit 22 transmits the manifest, the direction and visual field selection information, the reproduction control information, the synchronization information, and the like to the large screen display device 14, and transmits the content designation information, the entire image request, the reproduction control information, and the like to the distribution server 15.

The reproduction control unit 23 controls the mobile display device 13 to reproduce the content.

The synchronous clock generation unit 24 generates a clock signal used to match the synchronization states of the mobile display device 13 and the large screen display device 14, and supplies the clock signal to the reproduction control unit 23.

The image reproduction unit 25 demultiplexes and decodes the entire image transmitted from the distribution server 15 under the control of the reproduction control unit 23, and displays the image on a display unit (for example, a touch panel display) (not shown).

The selection screen generation unit 26 generates a selection screen as described with reference to FIG. 3 under the control of the reproduction control unit 23.

The selection screen control unit 27 performs control on the selection of the partial image displayed on the selection screen on the basis of the operation of the touch panel display by the user.

The large screen display device 14 includes a data reception unit 31, a data transmission unit 32, a reproduction control unit 33, a synchronous clock generation unit 34, and an image reproduction unit 35.

The data reception unit 31 receives various types of data transmitted from the mobile display device 13 or the distribution server 15 and supplies the data to the reproduction control unit 33. The data reception unit 31 receives the manifest, the direction and visual field selection information, the reproduction control information, the synchronization information, and the like transmitted from the mobile display device 13, and receives the partial image transmitted from the distribution server 15.

The data transmission unit 32 transmits various types of data to the mobile display device 13 or the distribution server 15 under the control of the reproduction control unit 33. For example, the data transmission unit 32 transmits the synchronization information to the mobile display device 13 or the partial image request to the distribution server 15.

The reproduction control unit 33 controls the large screen display device 14 to reproduce the content.

The synchronous clock generation unit 34 generates a clock signal used to match the synchronization states of the mobile display device 13 and the large screen display device 14, and supplies the clock signal to the reproduction control unit 33.

The image reproduction unit 35 demultiplexes and decodes the partial image transmitted from the distribution server 15 under the control of the reproduction control unit 33, and displays the image on a display panel (for example, a liquid crystal display) (not shown).

The distribution server 15 includes a data reception unit 41, a data transmission unit 42, a distribution control unit 43, and an image selection unit 44.

The data reception unit 41 receives various types of data transmitted from the mobile display device 13 or the large screen display device 14, and supplies the data to the distribution control unit 43. For example, the data reception unit 41 receives the content specification information, the entire image request, the reproduction control information, and the like transmitted from the mobile display device 13, and receives the partial image request transmitted from the large screen display device 14.

The data transmission unit 42 transmits various types of data to the mobile display device 13 or the large screen display device 14 under the control of the distribution control unit 43. For example, the data transmission unit 42 transmits the manifest, the entire image, and the like to the mobile display device 13, or transmits a partial image to the large screen display device 14.

The distribution control unit 43 controls the distribution server 15 to distribute the content.

The image selection unit 44 searches the content storage unit 16 under the control of the distribution control unit 43, and causes the content (manifest, entire image, partial image) acquired as the search result to be transmitted via the data transmission unit 42.

<First Processing Example of Content Distribution Processing>

An example of the content distribution processing executed in the content distribution system 11 of FIG. 6 will be described with reference to FIGS. 7 to 9.

Figure 7:
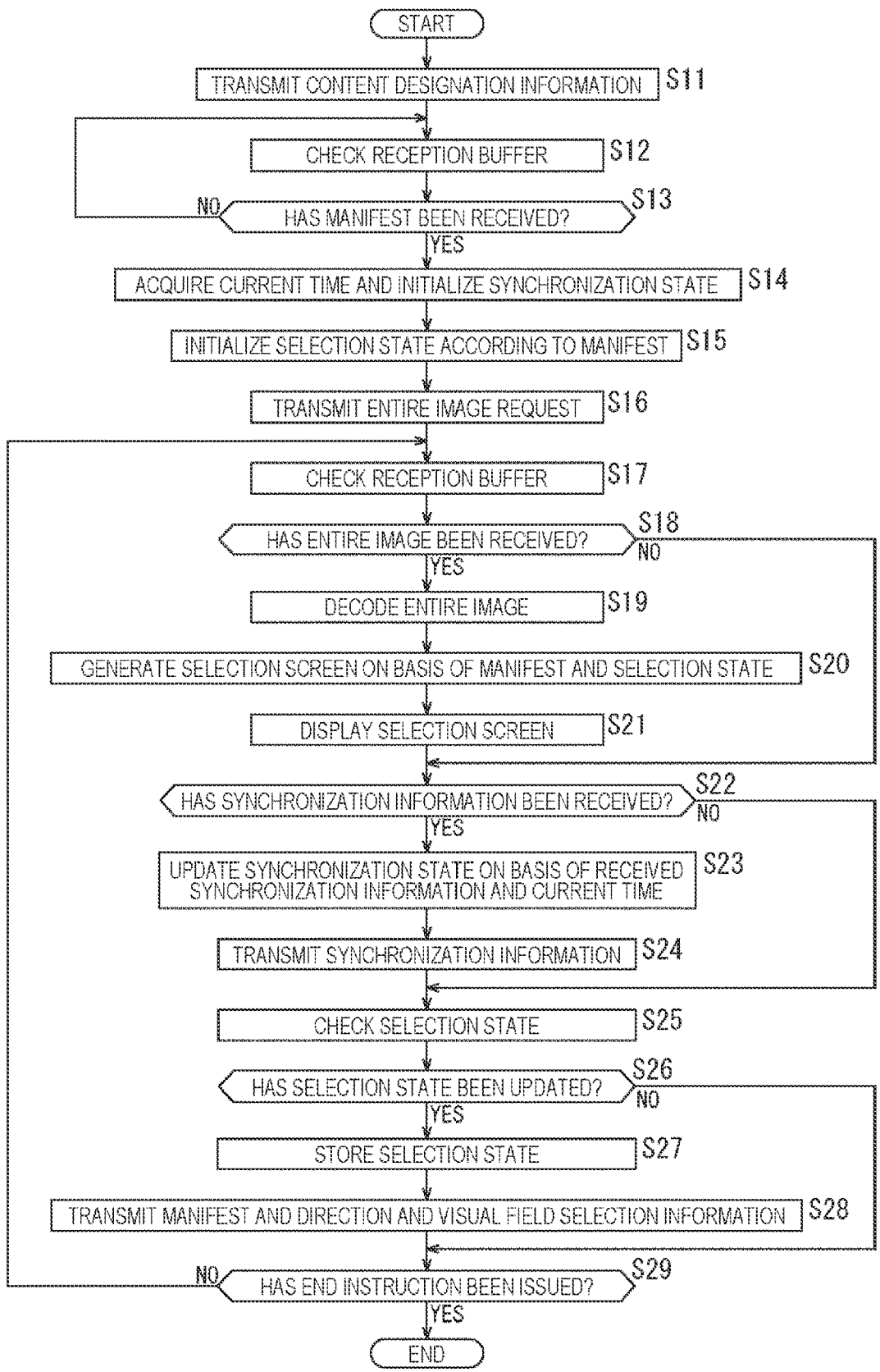
FIG. 7 is a flowchart for explaining content distribution processing executed by a mobile display device.

FIG. 7 is a flowchart for explaining content distribution processing executed by the mobile display device 13. For example, when the user performs operation on the touch panel display of the mobile display device 13, selects desired content, and requests distribution of the content, the content distribution processing is started.

In step S11, the reproduction control unit 23 instructs the data transmission unit 22 to transmit the content designation information that specifies the content selected by the user. In response to this, the data transmission unit 22 transmits the content designation information as described with reference to FIG. 5 to the distribution server 15.

In step S12, the reproduction control unit 23 checks the reception buffer of the data reception unit 21.

In step S13, the reproduction control unit 23 determines whether or not the data reception unit 21 has received the manifest transmitted from the distribution server 15 according to the content designation information transmitted in step S11 according to the check result of the reception buffer in step S12.

In step S13, in a case where the reproduction control unit 23 determines that the data reception unit 21 has not received the manifest, that is, when the state of the reception buffer is not received or is being received, the process returns to step S12. On the other hand, in step S13, in a case where the reproduction control unit 23 determines that the data reception unit 21 has received the manifest, that is, when the manifest exists in the reception buffer, the process proceeds to step S14.

In step S14, the reproduction control unit 23 acquires the current time according to the clock signal output from the synchronous clock generation unit 24, and initializes the synchronization state of the mobile display device 13. For example, the reproduction control unit 23 sets the current time as the real time, generates synchronization information as described with reference to FIG. 5 together with reproduction incidental information other than the real time, and stores the result as a synchronization state of the mobile display device 13.

In step S15, the reproduction control unit 23 initializes the selection state of the line-of-sight direction and the visual field according to the manifest transmitted from the distribution server 15. For example, the reproduction control unit 23 acquires the direction and visual field initial information (see FIGS. 2A and 2B) from the manifest and stores the direction and visual field initial information as the selection state of the mobile display device 13.

In step S16, the reproduction control unit 23 instructs the data transmission unit 22 to transmit the entire image request on the basis of the entire image information acquired from the manifest transmitted from the distribution server 15. In response to this, the data transmission unit 22 transmits the entire image request as described with reference to FIG. 5 to the distribution server 15.

In step S17, the reproduction control unit 23 checks the reception buffer of the data reception unit 21.

In step S18, the reproduction control unit 23 determines whether or not the data reception unit 21 has received the entire image transmitted from the distribution server 15 according to the entire image request transmitted in step S16 according to the check result of the reception buffer in step S17.

In step S18, in a case where the reproduction control unit 23 determines that the data reception unit 21 has received the entire image, that is, when the entire image exists in the reception buffer, the process proceeds to step S19.

In step S19, the reproduction control unit 23 supplies the entire image received by the data reception unit 21 to the image reproduction unit 25, and instructs the image reproduction unit 25 to demultiplex and decode the entire image. In response to this, the image reproduction unit 25 decodes the entire image.

In step S20, the reproduction control unit 23 supplies the entire image decoded in step S19 from the image reproduction unit 25 to the selection screen generation unit 26. Moreover, the reproduction control unit 23 supplies the manifest of the content and the current selection state in the mobile display device 13 to the selection screen generation unit 26, and instructs the selection screen generation unit 26 to generate a selection screen. In response to this, the selection screen generation unit 26 generates a selection screen as described with reference to FIG. 3.

For example, the selection screen generation unit 26 specifies coverage regions by the individual partial images on the entire image according to the partial image information registered in the manifest, and performs characteristic image processing (for example, brightness change as described with reference to FIG. 3) on the coverage regions. Moreover, the selection screen generation unit 26 generates a selection screen by performing characteristic image processing (for example, displaying a selection frame as shown in FIG. 3) based on the current selection state in the mobile display device 13.

In step S21, the reproduction control unit 23 supplies the selection screen generated in step S20 from the selection screen generation unit 26 to the image reproduction unit 25, and instructs the image reproduction unit 25 to display the selection screen. In response to this, the image reproduction unit 25 displays the selection screen on the touch panel display of the mobile display device 13.

After the processing of step S21, or in step S18, in a case where the reproduction control unit 23 determines that the data reception unit 21 has not received the entire image, that is, when the state of the reception buffer is not received or is being received, the process proceeds to step S22.

In step S22, the reproduction control unit 23 checks the reception buffer of the data reception unit 21 and determines whether or not the data reception unit 21 has received the synchronization information transmitted from the large screen display device 14 (processing of step S53 in FIG. 8 as described later).

In step S22, in a case where the reproduction control unit 23 determines that the data reception unit 21 has received the synchronization information of the large screen display device 14, that is, when the synchronization information of the large screen display device 14 exists in the reception buffer, the process proceeds to step S23.

In step S23, the reproduction control unit 23 displays updates the synchronization state of the mobile display device 13 on the basis of the synchronization information of the large screen display device 14 received by the data reception unit 21 and the current time according to the clock signal output from the synchronous clock generation unit 24. Note that the synchronization processing using this synchronization information will be described later with reference to FIGS. 18 to 21.

In step S24, the reproduction control unit 23 generates synchronization information of the mobile display device 13 according to the synchronization state updated in step S23, and instructs the data transmission unit 22 to transmit the synchronization information. In response to this, the data transmission unit 22 transmits the synchronization information of the mobile display device 13 to the large screen display device 14.

After the processing of step S24 or in step S22, in a case where the reproduction control unit 23 determines that the data reception unit 21 has not received the synchronization information of the large screen display device 14, that is, the state of the reception buffer is not received or being received, the process proceeds to step S25.

In step S25, the selection screen control unit 27 checks the current selection state of the mobile display device 13. That is, as shown in FIG. 3, among the plurality of partial images, the currently selected partial image is checked according to the user's operation on the touch panel display.

In step S26, the reproduction control unit 23 determines whether or not the selection state checked by the selection screen control unit 27 in step S25 is updated from the selection state of the mobile display device 13 currently stored.

In a case where the reproduction control unit 23 determines in step S26 that the selection state has been updated, the process proceeds to step S27.

In step S27, the reproduction control unit 23 stores the selection state checked by the selection screen control unit 27 in step S25 as a new selection state of the mobile display device 13, and generates direction and visual field selection information according to the selection state.

In step S28, the reproduction control unit 23 instructs the data transmission unit 22 to transmit the content manifest and the direction and visual field selection information generated in step S27. In response to this, the data transmission unit 22 transmits the manifest and the direction and visual field selection information to the large screen display device 14.

After the processing of step S28, or in a case where it is determined that the selection state checked by the selection screen control unit 27 in step S26 has not been updated, the process proceeds to step S29.

In step S29, the reproduction control unit 23 determines whether or not an instruction for the end of content distribution is given in response to the user's operation on the touch panel display.

In step S29, in a case where the reproduction control unit 23 determines that the instruction for the end of content distribution has not been given, the process returns to step S17, and the similar processing is repeated thereafter. On the other hand, in step S29, in a case where the reproduction control unit 23 determines that the instruction for the end of the content distribution is given, the content distribution processing in the mobile display device 13 ends.

Figure 8:
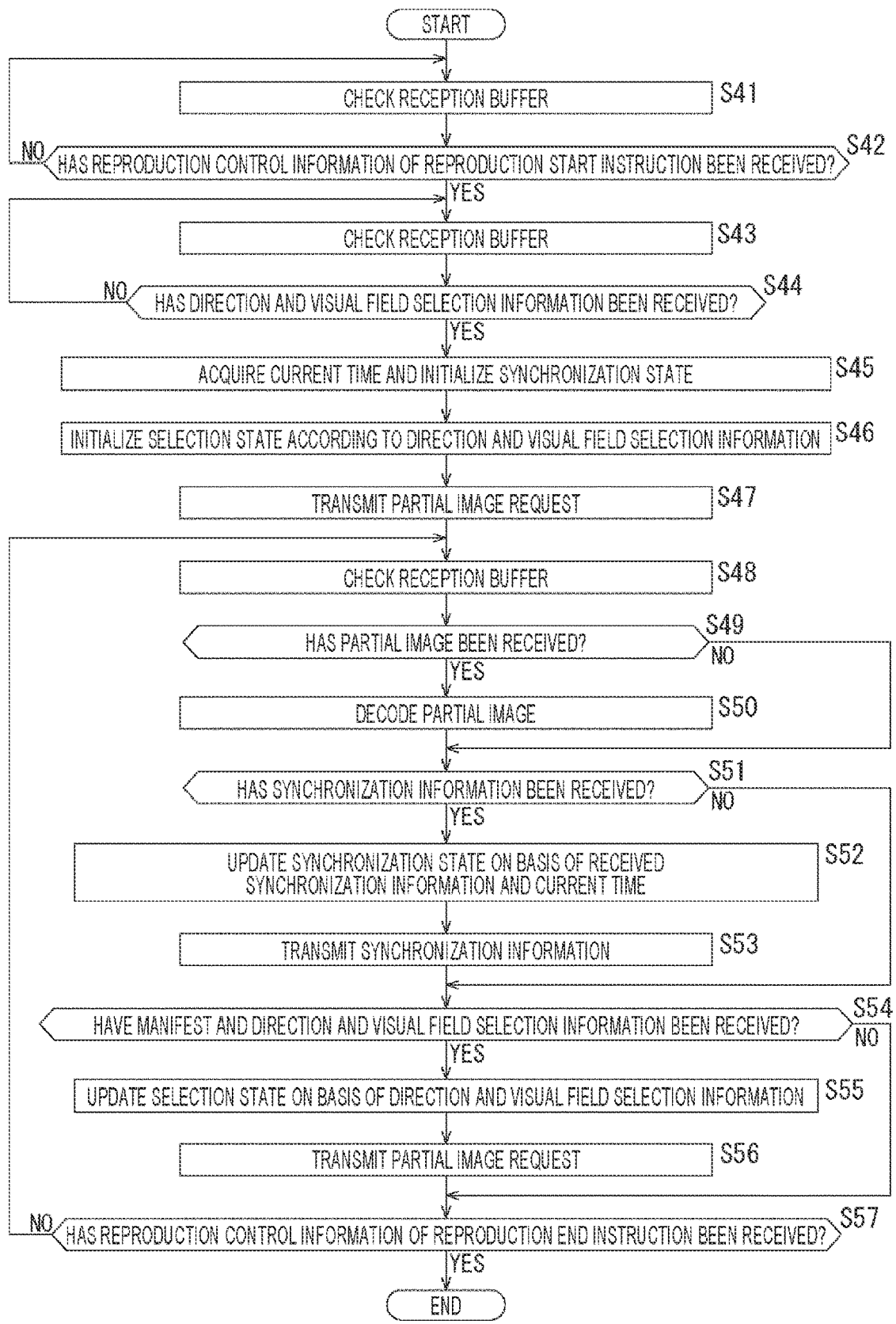
FIG. 8 is a flowchart for explaining content distribution processing executed by a large screen display device.

FIG. 8 is a flowchart for explaining content distribution processing executed by the large screen display device 14.

In step S41, the reproduction control unit 33 checks the reception buffer of the data reception unit 31.

In step S42, the reproduction control unit 33 determines whether or not the data reception unit 31 has received the reproduction control information (PLAY) giving an instruction for the start of image reproduction according to the check result of the reception buffer in step S41.

In step S42, in a case where the reproduction control unit 33 determines that the data reception unit 31 has not received the reproduction control information (PLAY), that is, when the state of the reception buffer is not received or is being received, the process returns to step S41. On the other hand, in step S42, in a case where the reproduction control unit 33 determines that the data reception unit 31 has received the reproduction control information (PLAY), that is, when the reproduction control information (PLAY) exists in the reception buffer, the process proceeds to step S43.

In step S43, the reproduction control unit 33 checks the reception buffer of the data reception unit 31.

In step S44, the reproduction control unit 33 determines whether or not the data reception unit 31 has received the direction and visual field selection information transmitted from the mobile display device 13 in step S28 of FIG. 7 according to the check result of the reception buffer in step S43.

In step S44, in a case where the reproduction control unit 33 determines that the data reception unit 31 has not received the direction and visual field selection information, that is, when the state of the reception buffer is not received or is being received, the process returns to step S43. On the other hand, in step S44, in a case where the reproduction control unit 33 determines that the data reception unit 31 has received the direction and visual field selection information, that is, when the direction and visual field selection information exists in the reception buffer, the process proceeds to step S45.

In step S45, the reproduction control unit 33 acquires the current time according to the clock signal output from the synchronous clock generation unit 34, and initializes the synchronization state of the large screen display device 14. For example, the reproduction control unit 33 sets the current time as the real time, generates synchronization information together with reproduction incidental information other than the real time, and stores the result as a synchronization state of the large screen display device 14.

In step S46, the reproduction control unit 33 initializes the selection state of the large screen display device 14 according to the direction and visual field selection information received by the data reception unit 31. That is, the reproduction control unit 33 stores the direction and the visual field of the line-of-sight indicated by the direction and visual field selection information received by the data reception unit 31 as the selection state of the large screen display device 14.

In step S47, the reproduction control unit 33 instructs the data transmission unit 32 to transmit the partial image request on the basis of the synchronization state and the selection state of the large screen display device 14. In response to this, the data transmission unit 32 transmits a partial image request as described with reference to FIG. 5 to the distribution server 15.

In step S48, the reproduction control unit 33 checks the reception buffer of the data reception unit 31.

In step S49, the reproduction control unit 33 determines whether or not the data reception unit 31 has received the partial image transmitted from the distribution server 15 according to the partial image request transmitted in step S47 according to the check result of the reception buffer in step S48.

In step S49, in a case where the reproduction control unit 33 determines that the data reception unit 31 has received the partial image, that is, when the partial image exists in the reception buffer, the process proceeds to step S50.

In step S50, the reproduction control unit 33 supplies the partial image received by the data reception unit 31 to the image reproduction unit 35, and instructs the image reproduction unit 35 to demultiplex and decode the partial image. In response to this, the image reproduction unit 25 decodes the partial image and displays the partial image on the display panel of the large screen display device 14.

After the processing of step S50, or in step S49, in a case where the reproduction control unit 33 determines that the data reception unit 31 has not received the partial image, that is, when the state of the reception buffer is not received or is being received, the process proceeds to step S51.

In step S51, the reproduction control unit 33 checks the reception buffer of the data reception unit 31 and determines whether or not the data reception unit 31 has received the synchronization information transmitted from the mobile display device 13 (processing of step S24 in FIG. 7 as described above).

In step S51, in a case where the reproduction control unit 33 determines that the data reception unit 31 has received the synchronization information of the mobile display device 13, that is, when the synchronization information of the mobile display device 13 exists in the reception buffer, the process proceeds to step S52.

In step S52, the reproduction control unit 33 displays updates the synchronization state of the large screen display device 14 on the basis of the synchronization information of the mobile display device 13 received by the data reception unit 31 and the current time according to the clock signal output from the synchronous clock generation unit 34. Note that the synchronization processing using this synchronization information will be described later with reference to FIGS. 18 to 21.

In step S53, the reproduction control unit 33 generates synchronization information of the large screen display device 14 according to the synchronization state updated in step S52, and instructs the data transmission unit 32 to transmit the synchronization information. In response to this, the data transmission unit 32 transmits the synchronization information of the large screen display device 14 to the mobile display device 13.

After the processing of step S53, or in step S51, in a case where the reproduction control unit 33 determines that the data reception unit 31 has not received the synchronization information, that is, when the state of the reception buffer is not received or is being received, the process proceeds to step S54.

In step S54, the reproduction control unit 33 checks the reception buffer of the data reception unit 31, and determines whether or not the data reception unit 31 has received the manifest and the direction and visual field selection information transmitted from the mobile display device 13 in step S28 of FIG. 7.

In step S54, in a case where the reproduction control unit 33 determines that the data reception unit 31 has received the manifest and the direction and visual field selection information, that is, when the manifest and the direction and visual field selection information exist in the reception buffer, the process proceeds to step S55.

In step S55, the reproduction control unit 33 updates the selection state of the large screen display device 14 on the basis of the direction and visual field selection information received by the data reception unit 31. That is, the reproduction control unit 33 overwrites the direction and the visual field of the line-of-sight indicated by the direction and visual field selection information received by the data reception unit 31 as the selection state of the large screen display device 14.

In step S56, the reproduction control unit 33 instructs the data transmission unit 32 to transmit the partial image request on the basis of the manifest and the synchronization state and the selection state of the large screen display device 14. In response to this, the data transmission unit 32 transmits a partial image request as described with reference to FIG. 5 to the distribution server 15.

In step S57, the reproduction control unit 33 checks the reception buffer of the data reception unit 31 and determines whether or not the data reception unit 31 has received the reproduction control information (END) giving an instruction for the end of image reproduction.

In step S57, in a case where the reproduction control unit 33 determines that the data reception unit 31 has not received the reproduction control information (END) giving an instruction for the end of image reproduction, the process returns to step S48, and the similar processing is repeated thereafter. On the other hand, in step S57, in a case where the reproduction control unit 33 determines that the data reception unit 31 has received the reproduction control information (END) giving an instruction for the end of image reproduction, that is, when the reproduction control information (END) exists in the reception buffer, the content distribution processing in the large screen display device 14 ends.

Figure 9:
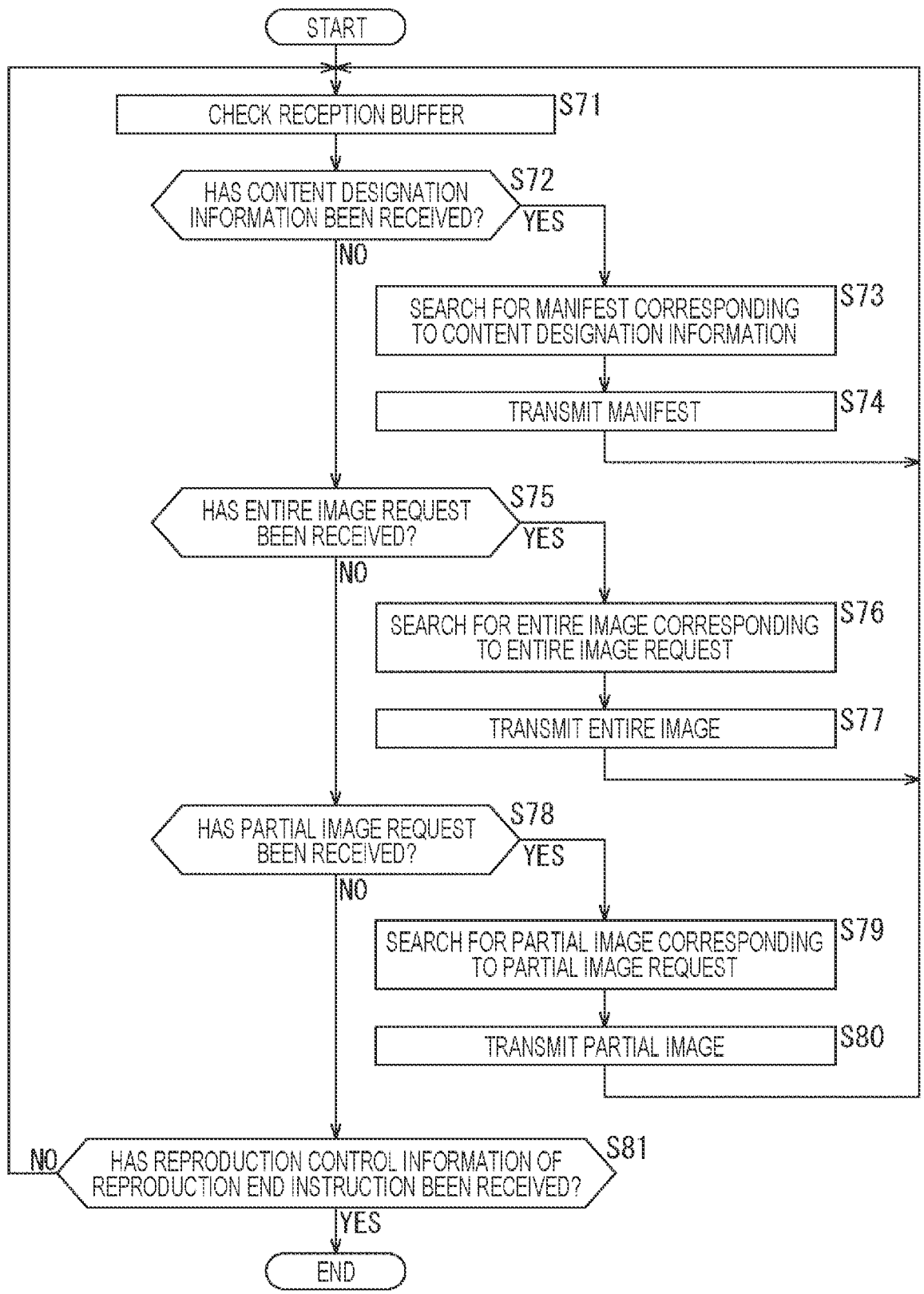
FIG. 9 is a flowchart for explaining content distribution processing executed by a distribution server.

FIG. 9 is a flowchart for explaining content distribution processing executed by the distribution server 15.

In step S71, the distribution control unit 43 checks the reception buffer of the data reception unit 41.

In step S72, the distribution control unit 43 determines whether or not the data reception unit 41 has received the content designation information transmitted from the mobile display device 13 in step S11 of FIG. 7 according to the check result of the reception buffer in step S71.

In step S72, in a case where the distribution control unit 43 determines that the data reception unit 41 has received the content designation information, the processing proceeds to step S73.

In step S73, the distribution control unit 43 instructs the image selection unit 44 to search for the manifest of the content designated by the content designation information received by the data reception unit 41. In response to this, the image selection unit 44 searches the content storage unit 16 using the manifest file ID indicated by the content designation information, and acquires the manifest acquired as the search result.

In step S74, the image selection unit 44 supplies the manifest acquired in step S73 to the data transmission unit 42, and the data transmission unit 42 transmits the manifest to the mobile display device 13 which is the request source. Thereafter, the process returns to step S71, and the similar processing is repeated thereafter.

On the other hand, in step S72, in a case where the distribution control unit 43 determines that the data reception unit 41 has not received the content designation information, the processing proceeds to step S75.

In step S75, the distribution control unit 43 determines whether or not the data reception unit 41 has received the entire image request transmitted from the mobile display device 13 in step S16 of FIG. 7 according to the check result of the reception buffer in step S71.

In step S75, in a case where the distribution control unit 43 determines that the data reception unit 41 has received the entire image request, the processing proceeds to step S76.

In step S76, the distribution control unit 43 instructs the image selection unit 44 to search for the entire image according to the entire image request received by the data reception unit 41. In response to this, the image selection unit 44 searches the content storage unit 16 using the entire image file ID indicated by the entire image request, and acquires the entire image acquired as the search result.

In step S77, the image selection unit 44 supplies the entire image acquired in step S76 to the data transmission unit 42, and the data transmission unit 42 transmits the entire image to the mobile display device 13 which is the request source. Thereafter, the process returns to step S71, and the similar processing is repeated thereafter.

On the other hand, in step S75, in a case where the distribution control unit 43 determines that the data reception unit 41 has not received the entire image request, the processing proceeds to step S78.

In step S78, the distribution control unit 43 determines whether or not the data reception unit 41 has received the partial image request transmitted from the large screen display device 14 in step S47 or S56 of FIG. 8 according to the check result of the reception buffer in step S71.

In step S78, in a case where the distribution control unit 43 determines that the data reception unit 41 has received the partial image request, the processing proceeds to step S79.

In step S79, the distribution control unit 43 instructs the image selection unit 44 to search for the partial image according to the partial image request received by the data reception unit 41. In response to this, the image selection unit 44 searches the content storage unit 16 using the partial image file ID indicated by the partial image request, and acquires the partial image acquired as the search result.

In step S80, the image selection unit 44 supplies the partial image acquired in step S79 to the data transmission unit 42, and the data transmission unit 42 transmits the partial image to the large screen display device 14 which is the request source. Thereafter, the process returns to step S71, and the similar processing is repeated thereafter.

On the other hand, in step S78, in a case where the distribution control unit 43 determines that the data reception unit 41 has not received the partial image request, the processing proceeds to step S81.

In step S81, the distribution control unit 43 determines whether or not the data reception unit 41 has received the reproduction control information (END) giving an instruction for the end of image reproduction according to the check result of the reception buffer in step S71.

In step S81, in a case where the distribution control unit 43 determines that the data reception unit 41 has not received the reproduction control information (END) giving an instruction for the end of image reproduction, the process returns to step S71, and the similar processing is repeated thereafter. On the other hand, in step S81, in a case where the distribution control unit 43 determines that the data reception unit 31 has received the reproduction control information (END) giving an instruction for the end of image reproduction, that is, when the reproduction control information (END) exists in the reception buffer, the content distribution processing in the distribution server 15 ends.

By the content distribution processing as described above performed in the content distribution system 11, the user can easily operate the content by using the mobile display device 13, and can experience a sufficient realistic feeling by the large screen display device 14.

For example, in the content distribution system 11, a low-resolution and low bit rate image can be used for the display of the mobile display device 13, and a high-resolution and high bit rate image can be used for the display of the large screen display device 14. Therefore, the user can select a partial image lightly and stress-free on the mobile display device 13, and display the selected partial image on the large screen display device 14 to enjoy high-quality viewing.

Furthermore, in the content distribution system 11, by preparing a thumbnail image in which guide information is superimposed on the display of the mobile display device 13 in advance, the user can easily search for a partial image by using the thumbnail image. For example, by superimposing subtitles such as the name of a building in a tourist spot or the name of a person as guide information, the user can select a desired partial image using such guide information as a clue. Note that since the partial image displayed on the large screen display device 14 uses image data that is different from the partial image displayed on the mobile display device 13, for example, it is possible to eliminate the necessity of complicated processing such as on/off of subtitle display of the guide information.

Here, conventionally, since the display of the selection screen for selecting a partial image and the display of the partial image distributed according to the selection are performed on the same display device, it is difficult for the user to view them at the same time. For example, in a method in which a distributed partial image is superimposed and displayed on the entire image on the selection screen, the display of the entire image in the range in which the partial image is superimposed is impaired, so that it is difficult to provide a preferable user experience.

On the other hand, in the content distribution system 11, the selection screen can be displayed on the mobile display device 13, the distributed partially image can be displayed on the large screen display device 14, the display of both images are not impaired, and the user can view them at the same time. Moreover, the user can select another partial image by the mobile display device 13 while continuing to view the partial image on the large screen display device 14.

Furthermore, in the conventional system having a configuration including a plurality of large screen display devices, in a case where the entire image is viewed and different partial images are displayed on large screen display devices, since corresponding partial image to be displayed is selected for each large screen display device by operating the remote controller, the operation becomes complicated.

On the other hand, in the content distribution system 11, since the partial image is selected by using the mobile display device 13 independent of the large screen display device 14, even in the configuration including a plurality of large screen display devices 14, the operation of selecting each partial image can be performed only by the mobile display device 13. That is, it is possible to select a partial image for each large screen display device 14 only by simple continuous operation (for example, three-times tap operation on the user interface displayed on the touch panel display) by the mobile display device 13.

As described above, the content distribution system 11 can have a configuration in which a plurality of large screen display devices 14 is linked to one mobile display device 13. In such a configuration, for example, a plurality of large screen display devices 14 may be given an order, or a plurality of large screen display devices 14 may be randomly selected.

Note that, in the content distribution system 11, not only the Internet protocol (IP) is used as an image acquisition route via the network 12, but a mobile phone communication network (LTE/4G/5G or the like) may be used, for example.

Furthermore, in the content distribution system 11, a synchronization packet (synchronization information) is exchanged between the mobile display device 13 and the large screen display device 14, and the reproduction position of content can be adjusted so that the advancement or delay from the reference time of the synchronization packet is eliminated. Furthermore, a method of synchronizing the reproduction of content by performing push distribution from the distribution server 15 may be adopted.

Furthermore, the user can specify the initial reproduction start position when starting the reproduction of content, at the start of reproduction. Furthermore, for the entire image, a format in which only a specific direction and a visual field are displayed may be adopted, and in addition, a format in which all directions are displayed at once, such as equirectangular projection may be adopted.

Moreover, in the content distribution system 11, the direction and visual field selection information is generated in the Media Presentation Description (MPD) format of the Moving Picture Experts Group Dynamic Adaptive Streaming over HTTP (MPEG-DASH) on the mobile display device 13. Then, the mobile display device 13 may transmit the direction and visual field selection information to the large screen display device 14 via the distribution server 15. Furthermore, the direction and visual field selection information may be stored in the distribution server 15, and the most selected statistical information of the direction and visual field selection information may be cached, and may be set as the direction and visual field initial information of the manifest.

<Second Configuration Example of Content Distribution System>

Figure 10:
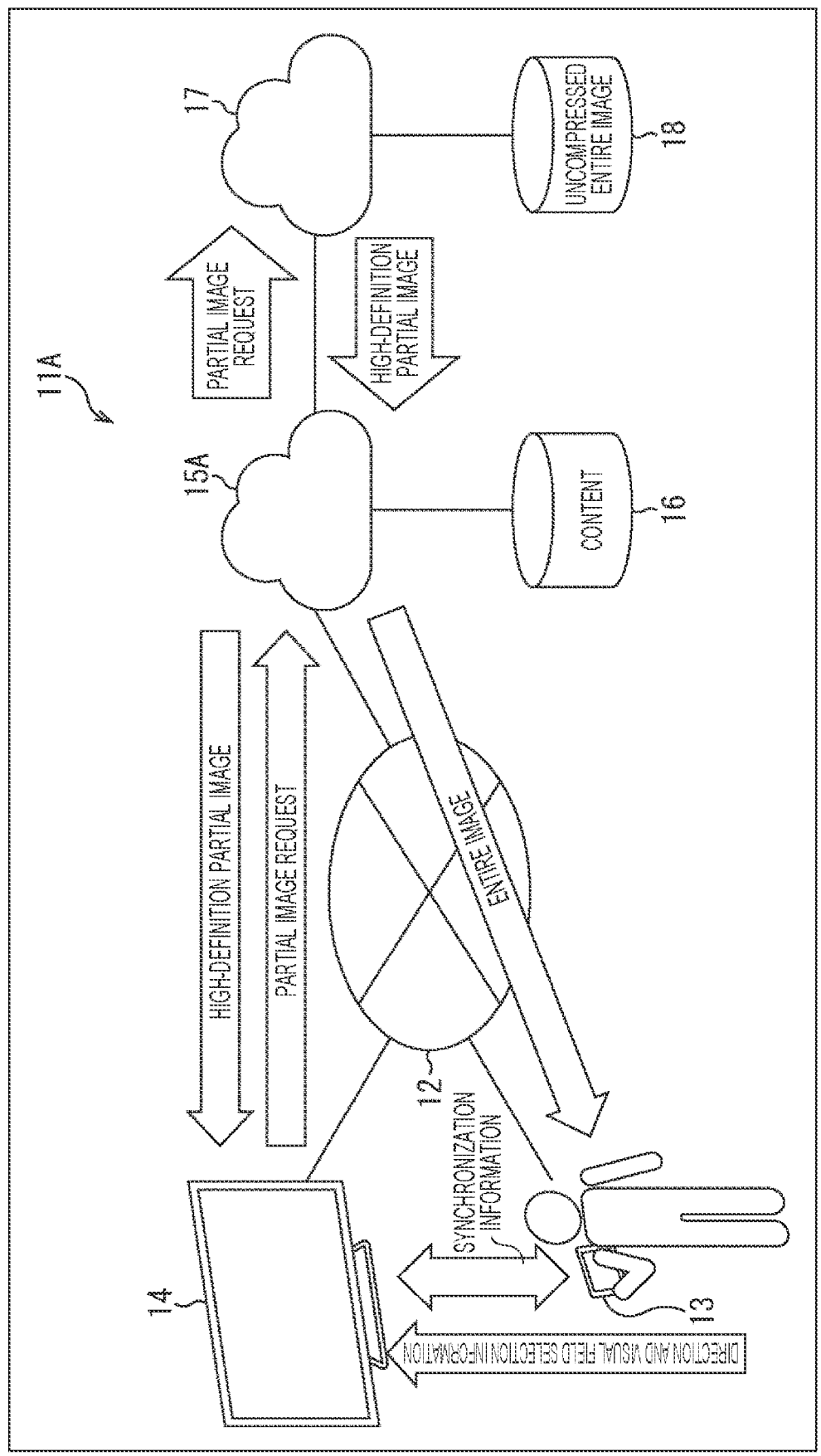
FIG. 10 is a block diagram showing a configuration example of a content distribution system according to a second embodiment to which the present technology is applied.

FIG. 10 is a block diagram showing a configuration example of a content distribution system according to a second embodiment to which the present technology is applied. Note that, in the content distribution system 11A shown in FIG. 10, the same reference numerals are given to the configurations common to the content distribution system 11 in FIG. 1, and detailed description thereof will be omitted.

The content distribution system 11A shown in FIG. 10 has a configuration common to that of the content distribution system 11 of FIG. 1 in a feature of configured by connecting a mobile display device 13, a large screen display device 14, and a distribution server 15A via a network 12, and a content storage unit 16 being connected to the distribution server 15A.

Then, the content distribution system 11A has a configuration different from that of the content distribution system 11 in FIG. 1 in a feature that the conversion server 17 is connected to the distribution server 15A and an uncompressed entire image storage unit 18 is connected to the conversion server 17.

In a case where the partial image for which distribution is requested from the large screen display device 14 is not stored in the content storage unit 16, the distribution server 15A requests the conversion server 17 for the partial image.

When a partial image is requested from the distribution server 15A, the conversion server 17 acquires a high-definition partial image by converting the uncompressed entire image stored in the uncompressed entire image storage unit 18, and acquires a high-definition partial image, and cause the content storage unit 16 to store the high-definition image.

The uncompressed entire image storage unit 18 stores the entire image included in the content distributed in the content distribution system 11 and is not reduced in resolution, that is, the uncompressed entire image stored in the uncompressed format.

The content distribution system 11A is configured as described above, and even if distribution of a partial image that is not stored in the content storage unit 16 is requested, the conversion server 17 converts the uncompressed entire image to generate a partial image so that the partial image according to the request can be distributed.

Figure 11:
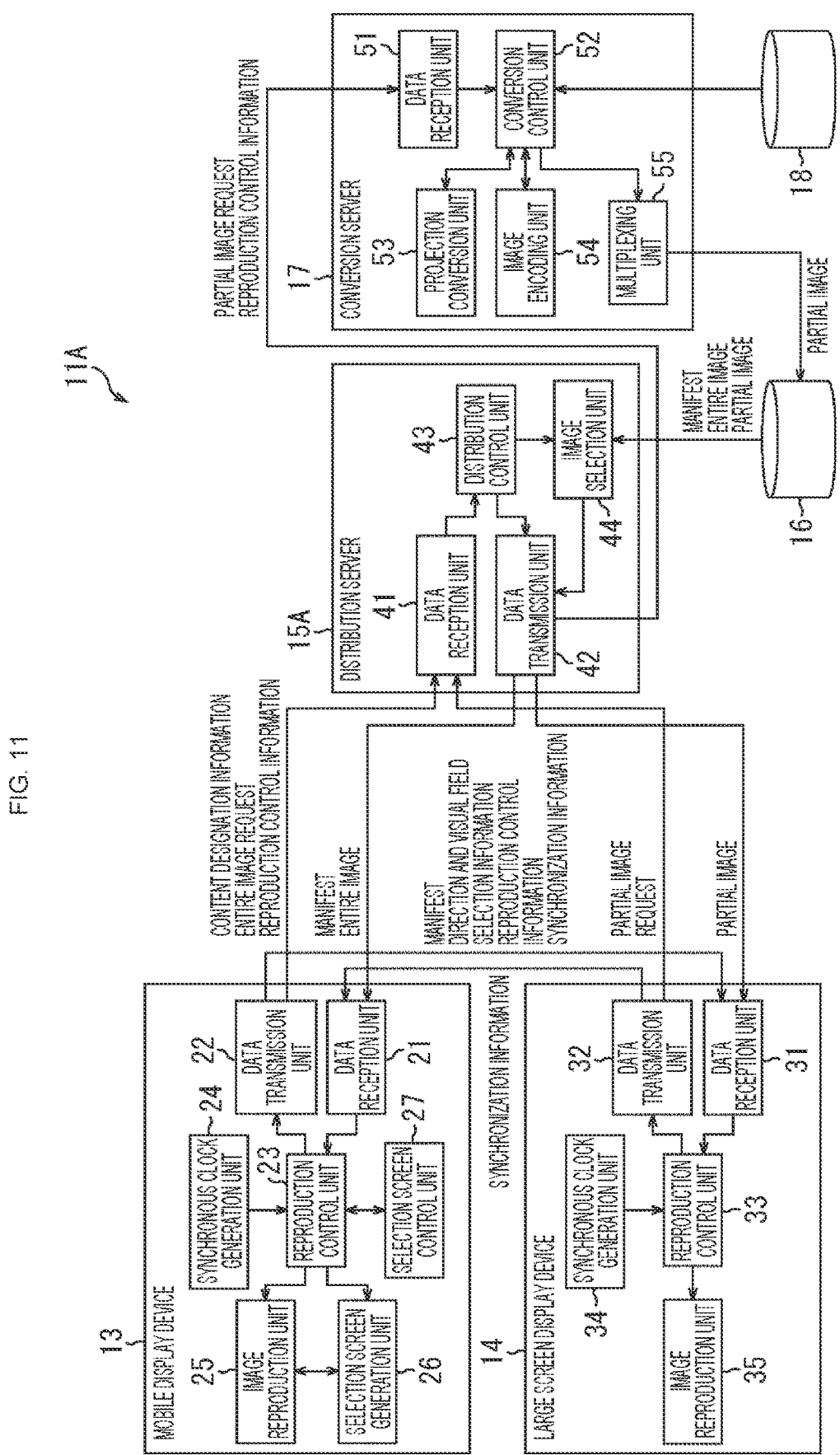
FIG. 11 is a detailed block diagram for explaining a configuration example of the content distribution system of FIG. 10.

FIG. 11 shows a block diagram for explaining the content distribution system 11A shown in FIG. 10 in detail. Note that, in the content distribution system 11A shown in FIG. 11, the same reference numerals are given to the configurations common to the content distribution system 11 in FIG. 6, and detailed description thereof will be omitted. That is, the mobile display device 13 and the large screen display device 14 included in the content distribution system 11A have the same configuration as that of the mobile display device 13 and the large screen display device 14 included in the content distribution system 11 of FIG. 6.

As similar to the distribution server 15 of FIG. 6, the distribution server 15A includes a data reception unit 41, a data transmission unit 42, a distribution control unit 43, and an image selection unit 44. However, the distribution server 15A has a configuration different from that of the distribution server 15 of FIG. 6 in a feature that the data transmission unit 42 is configured to transmit a partial image request, reproduction control information, and the like to the conversion server 17. Furthermore, the content storage unit 16 is configured so that a partial image is written from the conversion server 17.

The conversion server 17 includes a data reception unit 51, a conversion control unit 52, a projection conversion unit 53, an image encoding unit 54, and a multiplexing unit 55.

The data reception unit 51 receives a partial image request, reproduction control information, and the like transmitted from the distribution server 15A, and supplies the partial image request, the reproduction control information, and the like to the conversion control unit 52.

The conversion control unit 52 controls the conversion server 17 to convert an uncompressed entire image into a partial image.

The projection conversion unit 53 performs projection conversion on an uncompressed entire image so as to acquire a partial image according to a partial image request from the uncompressed entire image read from the uncompressed entire image storage unit 18 under the control of the conversion control unit 52.

The image encoding unit 54 encodes the projection conversion result (partial image) acquired as a result of the projection conversion from the uncompressed entire image by the projection conversion unit 53 under the control of the conversion control unit 52.

The multiplexing unit 55 multiplexes the encoding result acquired as a result of the image encoding unit 54 encoding the projection conversion result under the control of the conversion control unit 52, and writes the multiplexing result (partial image) acquired as a result in the content storage unit 16. At this time, the multiplexing unit 55 adds partial image information (FIGS. 2A and 2B) of the newly acquired partial image to the manifest of the content.

<Second Processing Example of Content Distribution Processing>

An example of the content distribution processing executed in the content distribution system 11A of FIG. 11 will be described with reference to FIGS. 12 and 13. Note that the content distribution processing executed by the mobile display device 13 is similar to the processing described with reference to the flowchart of FIG. 7, and the content distribution processing executed by the large screen display device 14 is similar to the processing described with reference to the flowchart of FIG. 8, and the description thereof will be omitted.

Figure 12:
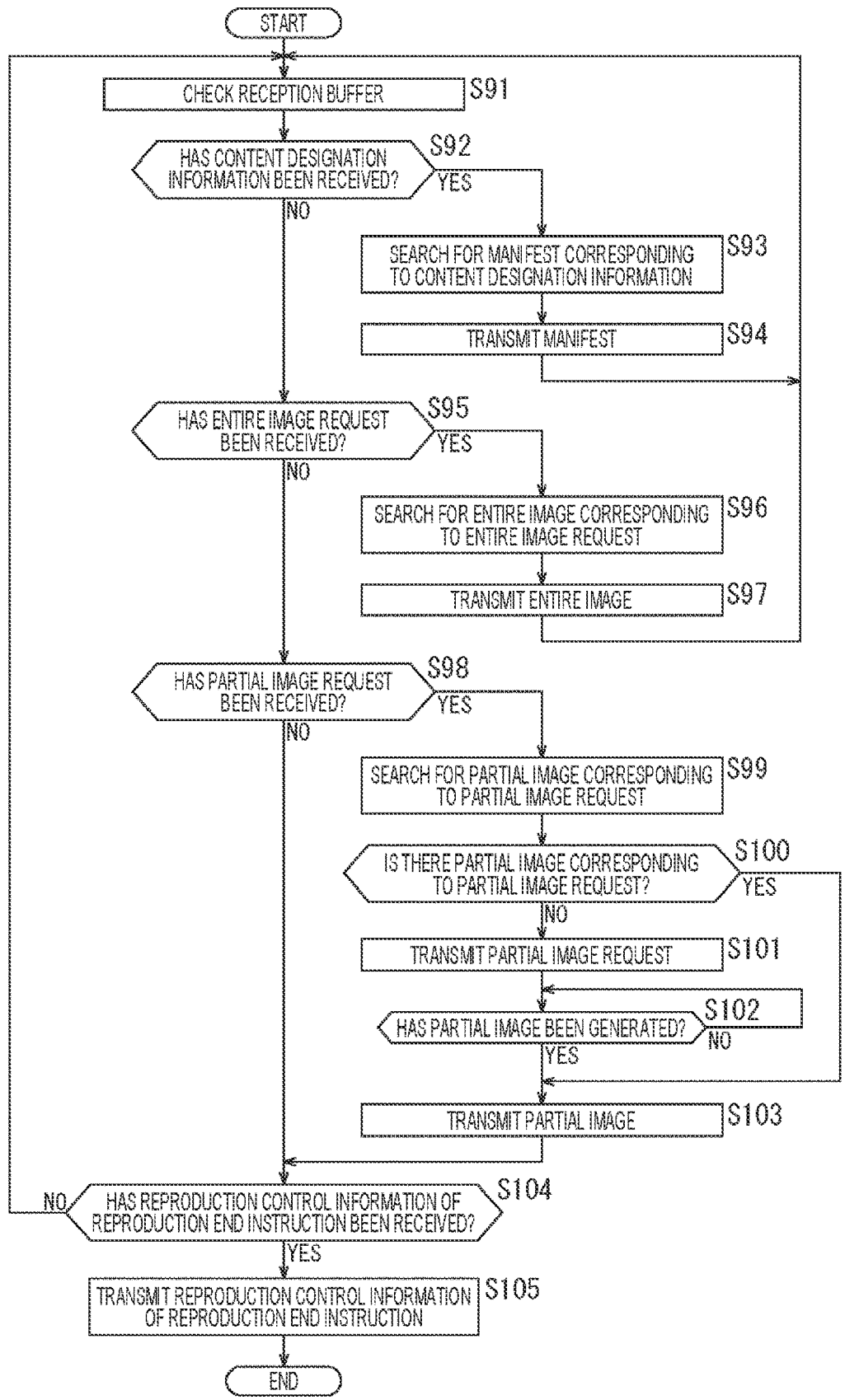
FIG. 12 is a flowchart for explaining content distribution processing executed by a distribution server.

FIG. 12 is a flowchart for explaining content distribution processing executed by the distribution server 15A.

In steps S91 to S99, similar processing to the processing in steps S71 to S79 in FIG. 9 is performed. Then, in step S100, the image selection unit 44 determines whether or not the partial image corresponding to the partial image request exists in the content storage unit 16 as a result of the search in step S99.

In step S100, in a case where the image selection unit 44 determines that the partial image corresponding to the partial image request does not exist in the content storage unit 16, the process proceeds to step S101.

In step S101, the data transmission unit 42 transmits a partial image request to the conversion server 17 under the control of the image selection unit 44.

In step S102, the image selection unit 44 determines whether or not the partial image has been generated in the conversion server 17 according to the partial image request transmitted to the conversion server 17 in step S101. For example, when the partial image generated by the conversion server 17 is written to the content storage unit 16 (processing in step S116 of FIG. 13 as described later), the image selection unit 44 determines that the partial image is generated by the conversion server 17.

Then, in step S102, the process waits until the image selection unit 44 determines that the partial image has been generated in the conversion server 17, and when it is determined that the partial image has been generated in the conversion server 17, the process proceeds to step S103. Alternatively, in step S100, in a case where the image selection unit 44 determines that the partial image corresponding to the partial image request exists in the content storage unit 16, the process proceeds to step S103.

In step S103, the image selection unit 44 acquires the partial image acquired as the search result in step S99 or the partial image generated by the conversion server 17 from the content storage unit 16 and supplies the partial image to the data transmission unit 42. Then, the data transmission unit 42 transmits the partial image to the large screen display device 14 which is the request source.

On the other hand, in step S98, in a case where the distribution control unit 43 determines that the data reception unit 41 has not received the partial image request, or after the processing of step S103, the process proceeds to step S104.

In step S104, the distribution control unit 43 determines whether or not the data reception unit 41 has received the reproduction control information (END) giving an instruction for the end of image reproduction according to the check result of the reception buffer in step S91.

In step S104, in a case where the distribution control unit 43 determines that the data reception unit 41 has not received the reproduction control information (END) giving an instruction for the end of image reproduction, the process returns to step S91, and the similar processing is repeated thereafter. On the other hand, in step S104, in a case where the distribution control unit 43 determines that the data reception unit 31 has received the reproduction control information (END) giving an instruction for the end of image reproduction, that is, when the reproduction control information (END) exists in the reception buffer, the process proceeds to step S105.

In step S105, the distribution control unit 43 instructs the data transmission unit 42 to transmit the reproduction control information (END) giving an instruction for the end of the image reproduction. In response to this, the data transmission unit 42 transmits the reproduction control information (END) giving an instruction for the end of image reproduction to the conversion server 17, and then the content distribution processing in the content storage unit 16 ends.

Figure 13:
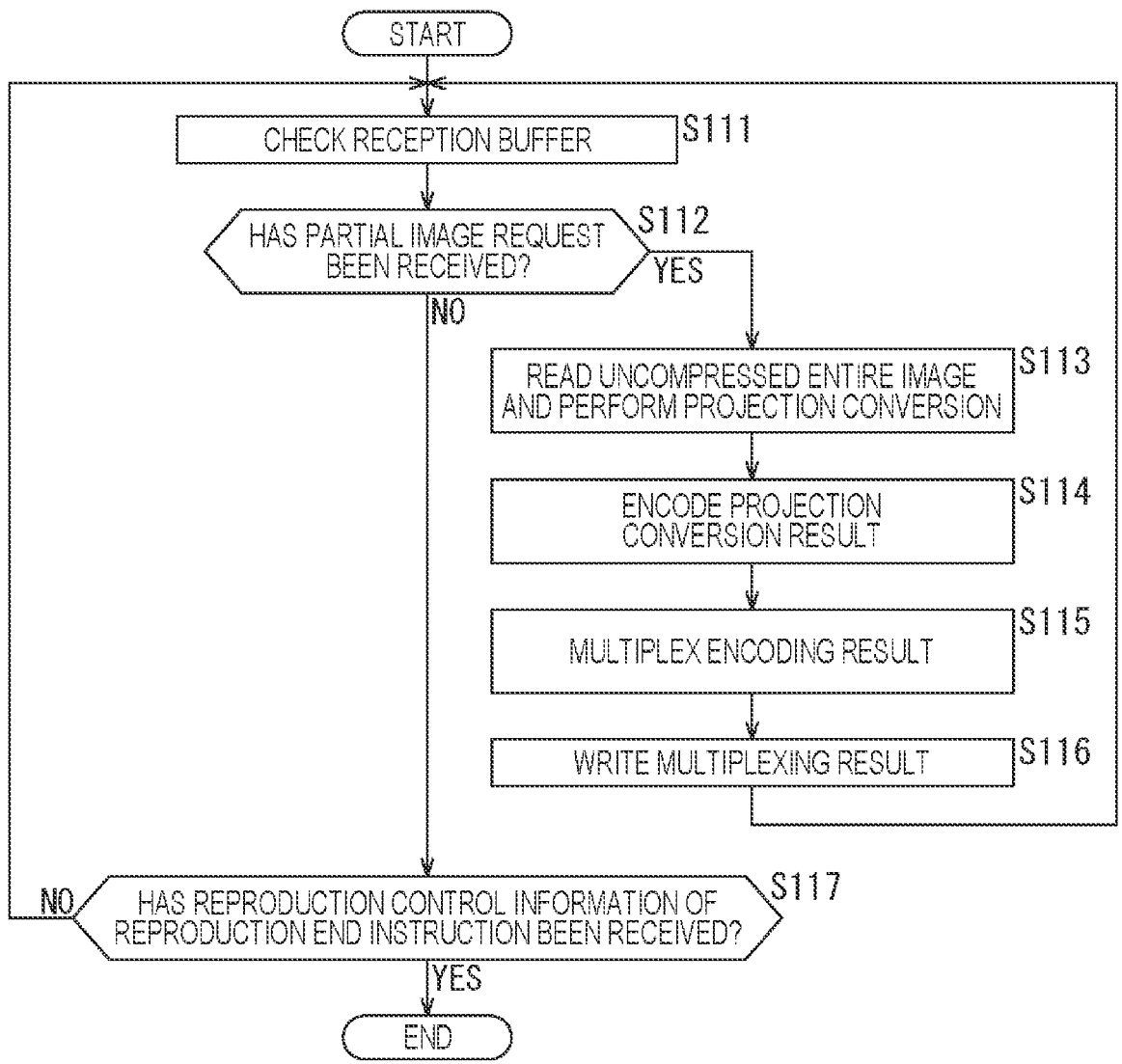
FIG. 13 is a flowchart for explaining conversion processing executed by a conversion server.

FIG. 13 is a flowchart for explaining conversion processing executed by the conversion server 17.

In step S111, the conversion control unit 52 checks the reception buffer of the data reception unit 51.

In step S112, the conversion control unit 52 determines whether or not the data reception unit 51 has received the partial image request transmitted from the content storage unit 16 in step S101 of FIG. 12 described above according to the check result of the reception buffer in step S111.

In step S112, in a case where the conversion control unit 52 determines that the data reception unit 51 has received the partial image request, that is, when the partial image request exists in the reception buffer, the process proceeds to step S113.

In step S113, the conversion control unit 52 reads an uncompressed entire image from the uncompressed entire image storage unit 18 and instructs the projection conversion unit 53 to perform projection conversion of the uncompressed entire image on the basis of the partial image request. In response to this, the projection conversion unit 53 performs projection conversion on the uncompressed entire image.

In step S114, the conversion control unit 52 supplies the projection conversion result by the projection conversion unit 53 and the partial image request to the image encoding unit 54, and instructs the image encoding unit 54 to encode the projection conversion result. In response to this, the image encoding unit 54 encodes the projection conversion result according to the setting of the partial image request.

In step S115, the conversion control unit 52 supplies the encoding result by the image encoding unit 54 and the partial image request to the multiplexing unit 55, and instructs the multiplexing unit 55 to perform multiplexing. In response to this, the multiplexing unit 55 multiplexes the encoding result according to the setting of the partial image request.

In step S116, the multiplexing unit 55 writes out the multiplexing result acquired by the multiplexing in step S115, that is, the partial image corresponding to the partial image request, to the content storage unit 16. Thereafter, the process returns to step S111, and the similar processing is repeated thereafter.

On the other hand, in step S112, in a case where the conversion control unit 52 determines that the data reception unit 51 has not received the partial image request, that is, when the partial image request does not exist in the reception buffer, the process proceeds to step S117.

In step S117, the conversion control unit 52 determines whether or not the data reception unit 51 has received the reproduction control information (END) giving an instruction for the end of the image reproduction, transmitted from the content storage unit 16 in step S105 of FIG. 12 described above according to the check result of the reception buffer in step S111.

In step S117, in a case where the conversion control unit 52 determines that the data reception unit 51 has not received the reproduction control information (END) giving an instruction for the end of image reproduction, the process returns to step S111, and the similar processing is repeated thereafter.

On the other hand, in step S117, in a case where the conversion control unit 52 determines that the data reception unit 51 has received the reproduction control information (END) giving an instruction for the end of image reproduction, the conversion processing in the conversion server 17 ends.

As described above, in the content distribution system 11A, the cloud resource can be utilized to display the partial image in the same direction and the same visual field as that the user displays on the mobile display device 13 on the large screen display device 14. Therefore, in the content distribution system 11A, the direction and the visual field can be easily selected by using the mobile display device 13, and the partial image can be displayed in high definition by using the large screen display device 14, and it is possible to realize seamless switching of the display of the partial image on the large screen display device 14.

<Third Configuration Example of Content Distribution System>

Figure 14:
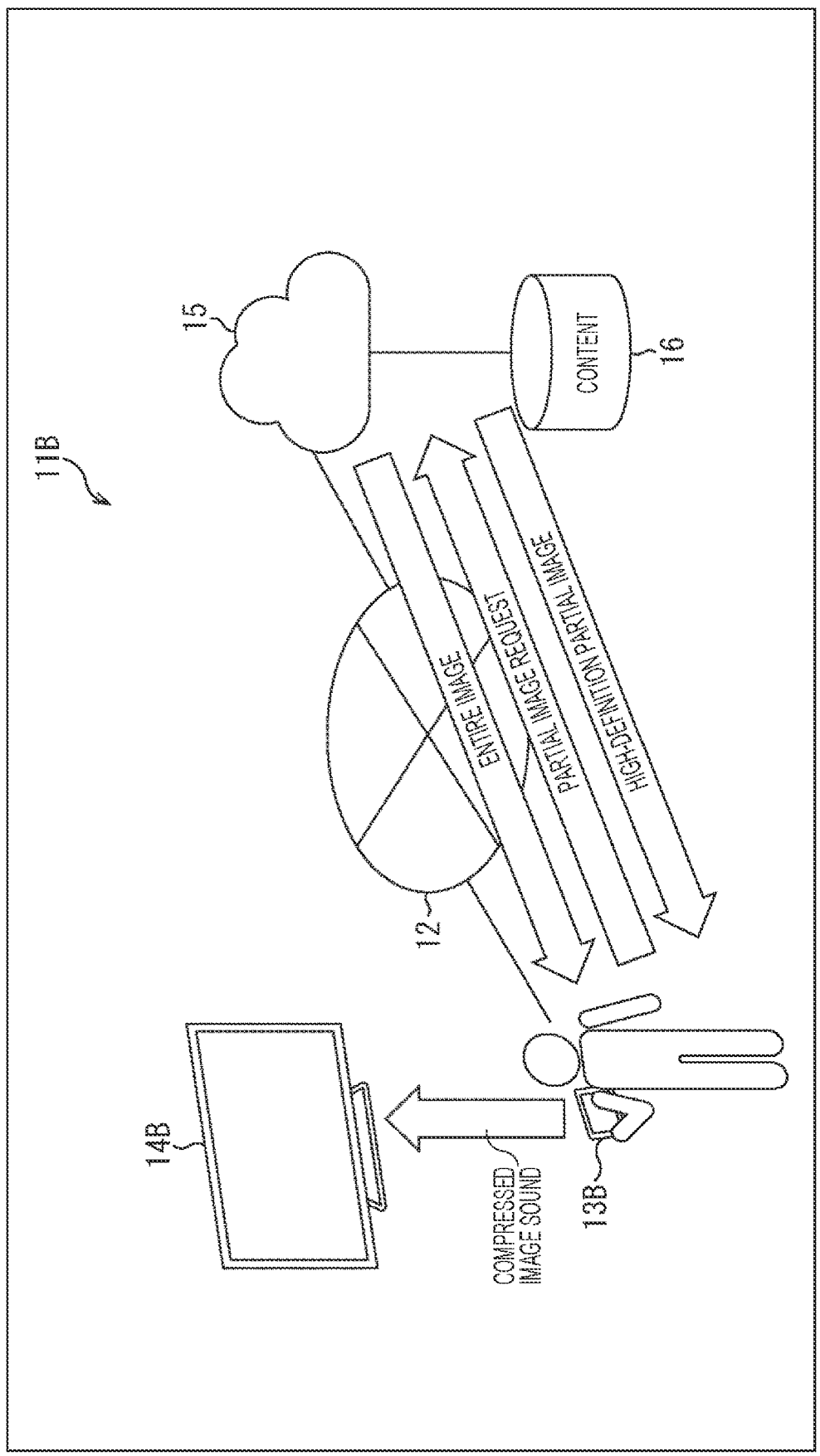
FIG. 14 is a block diagram showing a configuration example of a content distribution system according to a third embodiment to which the present technology is applied.

FIG. 14 is a block diagram showing a configuration example of a content distribution system according to a third embodiment to which the present technology is applied. Note that, in the content distribution system 11B shown in FIG. 14, the same reference numerals are given to the configurations common to the content distribution system 11 in FIG. 1, and detailed description thereof will be omitted.

The content distribution system 11B shown in FIG. 14 has a configuration common to that of the content distribution system 11 of FIG. 1 in a feature of configured by connecting a mobile display device 13B, and a distribution server 15 via a network 12, and a content storage unit 16 being connected to the distribution server 15.

Then, the content distribution system 11B is different from the content distribution system 11 of FIG. 1 in a feature that the large screen display device 14B is not connected to the network 12, and compressed image and sound is transmitted from the mobile display device 13B to the large screen display device 14B.

For example, in the content distribution system 11B, the entire image is distributed from the distribution server 15 to the mobile display device 13, and a partial image request is transmitted from the mobile display device 13 to the distribution server 15. Then, the distribution server 15 reads a high-definition partial image from the content storage unit 16 and transmits the partial image to the mobile display device 13 in response to the partial image request, and the mobile display device 13 wirelessly transmits compressed image and sound obtained by compressing sound together with the partial image, to the large screen display device 14. Therefore, the partial image is displayed on the large screen display device 14.

Figure 15:
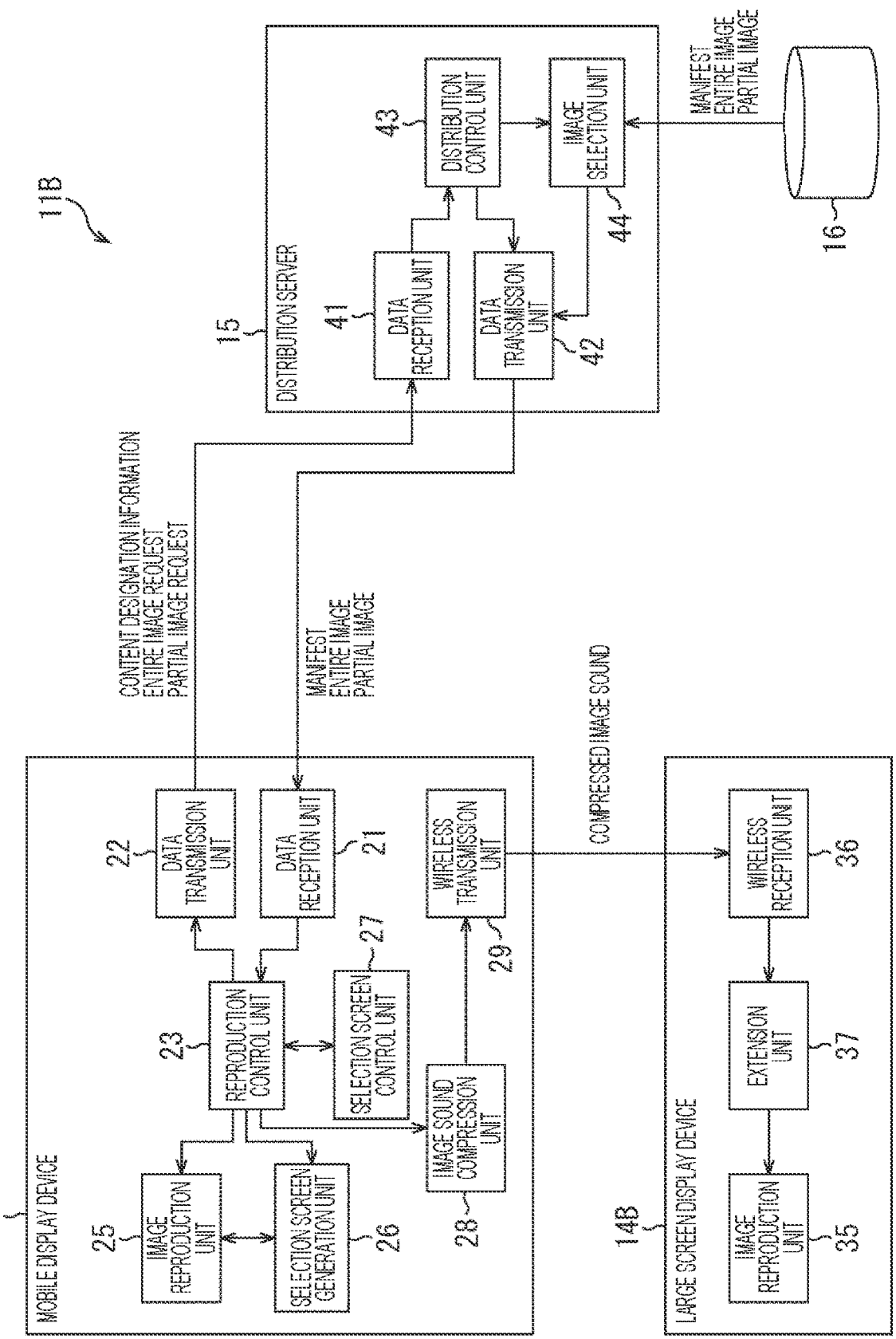
FIG. 15 is a detailed block diagram for explaining a configuration example of the content distribution system of FIG. 14.

FIG. 15 shows a block diagram for explaining the content distribution system 11B shown in FIG. 14 in detail. Note that, in the content distribution system 11B shown in FIG. 15, the same reference numerals are given to the configurations common to the content distribution system 11 in FIG. 6, and detailed description thereof will be omitted. That is, the distribution server 15 and the content storage unit 16 included in the content distribution system 11B have configurations common to configurations of the distribution server 15 and the content storage unit 16 included in the content distribution system 11 of FIG. 6.

The mobile display device 13B has a configuration common to the configuration of the mobile display device 13 of FIG. 6 in a feature of including the data reception unit 21, the data transmission unit 22, the reproduction control unit 23, the image reproduction unit 25, the selection screen generation unit 26, and the selection screen control unit 27. Then, the mobile display device 13B has a configuration different from that of the mobile display device 13 of FIG. 6 in a feature of including an image sound compression unit 28 and a wireless transmission unit 29.

The image sound compression unit 28 generates compressed image sound by compressing the partial image transmitted from the distribution server 15 together with sound of the partial image under the control of the reproduction control unit 23, and supplies the compressed image sound to the wireless transmission unit 29.

The wireless transmission unit 29 wirelessly transmits the compressed image sound supplied from the image sound compression unit 28 to the large screen display device 14B.

The large screen display device 14B has a configuration common to that of the large screen display device 14 of FIG. 6 in a feature of including an image reproduction unit 35. Then, the large screen display device 14B has a configuration different from that of the large screen display device 14 of FIG. 6 in a feature of including a wireless reception unit 36 and an extension unit 37.

The wireless reception unit 36 receives the compressed image sound wirelessly transmitted from the mobile display device 13B and supplies the compressed image sound to the extension unit 37.

The extension unit 37 expands and extends the compressed image sound supplied from the wireless reception unit 36 and supplies the compressed image sound to the image reproduction unit 35, and thereby, the partial image is reproduced by the image reproduction unit 35.

<Third Processing Example of Content Distribution Processing>

An example of the content distribution processing executed in the content distribution system 11B of FIG. 15 will be described with reference to FIGS. 16 and 17. Note that the content distribution processing executed by the distribution server 15 is similar to the processing described with reference to the flowchart of FIG. 9, and the description thereof will be omitted.

Figure 16:
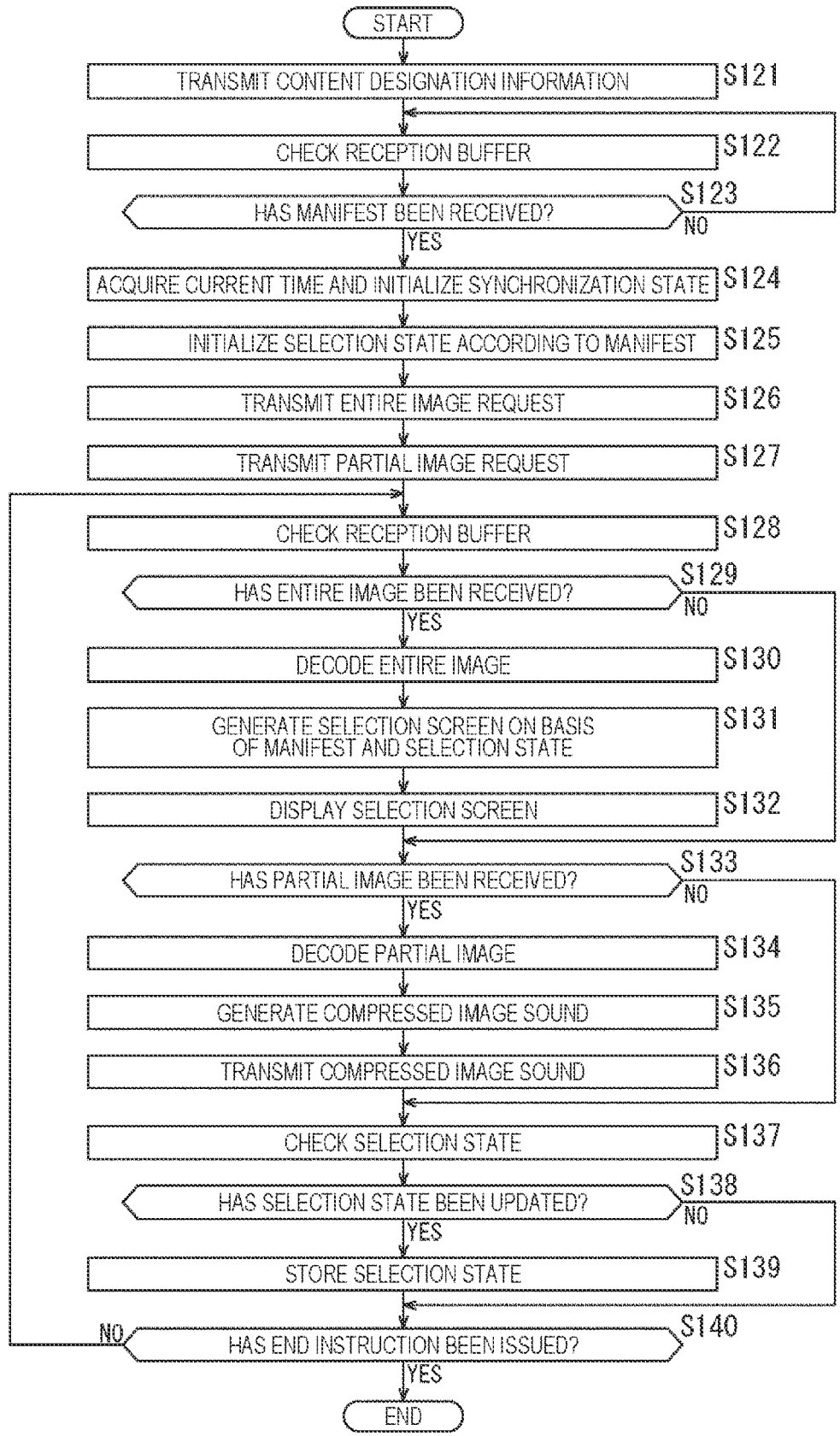
FIG. 16 is a flowchart for explaining content distribution processing executed by a mobile display device.

FIG. 16 is a flowchart for explaining content distribution processing executed by the mobile display device 13B.

In steps S121 to S126, similar processing to the processing in steps S11 to S16 in FIG. 7 is performed.

Then, in step S127, the reproduction control unit 23 instructs the data transmission unit 22 to transmit the partial image request on the basis of the selection state of the mobile display device 13B. In response to this, the data transmission unit 22 transmits a partial image request as described with reference to FIG. 5 to the distribution server 15.

Furthermore, in steps S128 to S132, similar processing to the processing in steps S17 to S21 in FIG. 7 is performed.

Then, in step S133, the reproduction control unit 23 checks the reception buffer of the data reception unit 21 to determine whether or not the data reception unit 21 has received the partial image transmitted from the distribution server 15 according to the partial image request transmitted in step S127.

In step S133, in a case where the reproduction control unit 23 determines that the data reception unit 21 has received the partial image, that is, when the partial image exists in the reception buffer, the process proceeds to step S134.

In step S134, the reproduction control unit 23 supplies the partial image received by the data reception unit 21 to the image reproduction unit 25, and instructs the image reproduction unit 25 to demultiplex and decode the partial image. In response to this, the image reproduction unit 25 decodes the partial image.

In step S135, the reproduction control unit 23 instructs the image sound compression unit 28 to compress the partial image and sound decoded by the image reproduction unit 25. In response to this, the image sound compression unit 28 compresses the partial image and sound to generate compressed image sound.

In step S136, the image reproduction unit 25 instructs the wireless transmission unit 29 to wirelessly transmit the compressed image sound generated by the image sound compression unit 28 to the large screen display device 14B. In response to this, the wireless transmission unit 29 transmits the compressed image sound.

After the processing of step S136, or in a case where the reproduction control unit 23 determines in step S133 that the data reception unit 21 has not received the partial image, the processing proceeds to step S137.

In step S137, the selection screen control unit 27 checks the current selection state of the mobile display device 13B. That is, as shown in FIG. 3, among the plurality of partial images, the currently selected partial image is checked according to the user's operation on the touch panel display.

In step S138, the reproduction control unit 23 determines whether or not the selection state checked by the selection screen control unit 27 in step S137 is updated from the selection state of the mobile display device 13B currently stored.

In a case where the reproduction control unit 23 determines in step S138 that the selection state has been updated, the process proceeds to step S139.

In step S139, the reproduction control unit 23 stores the selection state checked by the selection screen control unit 27 in step S137 as a new selection state of the mobile display device 13B.

After the processing of step S139, or in a case where the reproduction control unit 23 determines in step S138 that the selection state has not been updated, the process proceeds to step S140.

In step S140, the reproduction control unit 23 determines whether or not an instruction for the end of content distribution is given in response to the user's operation on the touch panel display.

In step S140, in a case where the reproduction control unit 23 determines that the instruction for the end of content distribution has not been instructed, the process returns to step S128, and the similar processing is repeated thereafter. On the other hand, in step S140, in a case where the reproduction control unit 23 determines that the instruction for the end of the content distribution is given, the content distribution processing in the mobile display device 13B is ended.

Figure 17:
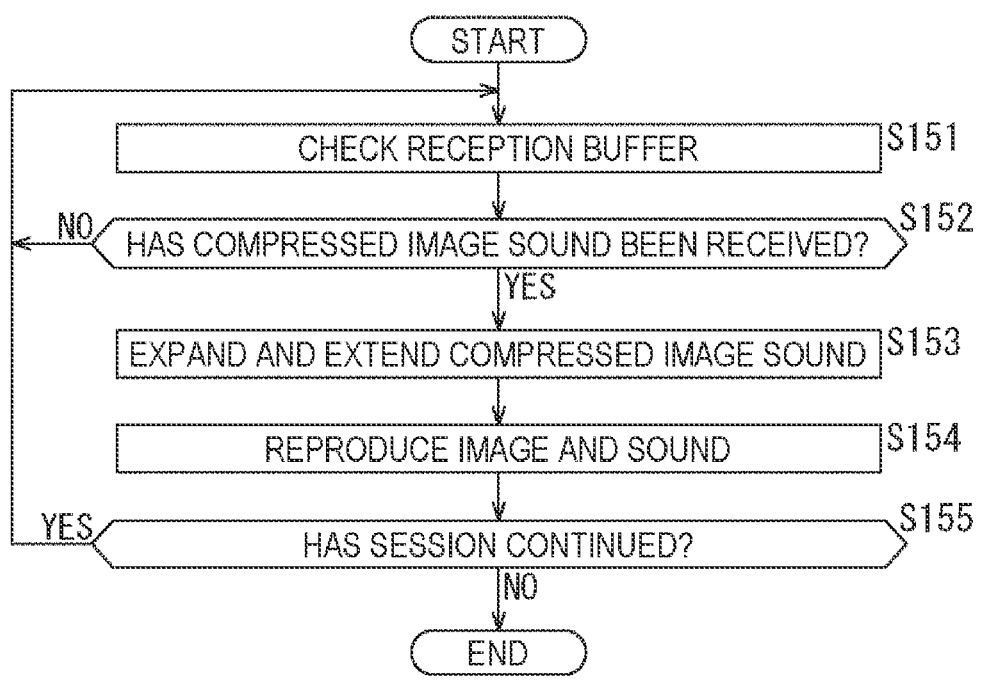
FIG. 17 is a flowchart for explaining content distribution processing executed by a large screen display device.

FIG. 17 is a flowchart for explaining content distribution processing executed by the large screen display device 14B.

In step S151, the extension unit 37 checks the reception buffer of the wireless reception unit 36.

In step S152, the extension unit 37 determines whether or not the wireless reception unit 36 has received the compressed image sound transmitted in step S136 of FIG. 16 according to the check result of the reception buffer in step S152.

In step S152, in a case where the extension unit 37 determines that the wireless reception unit 36 has not received the compressed image sound, the process returns to step S151, and the similar processing is repeated thereafter.

On the other hand, in step S152, in a case where the extension unit 37 determines that the wireless reception unit 36 has received the compressed image sound, that is, when the compressed image sound exists in the reception buffer, the process proceeds to step S153.

In step S153, the extension unit 37 expands and extends the compressed image sound received by the wireless reception unit 36.

In step S154, the image reproduction unit 35 reproduces the partial image and sound expanded and extended by the extension unit 37.

In step S155, the wireless reception unit 36 determines whether or not the reception session is continuing with the wireless transmission unit 29 of the mobile display device 13B, and in a case where the reception session is continuing, the process returns to step S151, and similar processing is repeated thereafter.

On the other hand, in step S155, in a case where the data reception unit 31 determines that the reception session is not continuing, the content distribution processing in the large screen display device 14B ends.

As described above, in the content distribution system 11B, simple operability by the mobile display device 13B can be acquired, and the high decoding ability of the mobile display device 13B can be used for displaying the selection screen for selecting a partial image and for decoding a partial image to be displayed on the large screen display device 14B. Then, by assigning only the partial image display to the large screen display device 14B, it is possible to make the best use of the features of each device and provide a preferable user experience for the user who views the content.

Furthermore, in the content distribution system 11B, the mobile display device 13B performs both the display of a partial image on the selection screen and the decoding of a partial image to be displayed on the large screen display device 14B. Therefore, it is not necessary to perform synchronization processing between devices in order to synchronize the reproduction of those images.

Note that, in a case where the mobile display device 13B has a processing capacity capable of simultaneously decoding a partial image on the selection screen and a partial image to be displayed on the large screen display device 14B, and simultaneously performing display of the selection screen and wireless transmission of a partial image to the large screen display device 14B, the display of the selection screen and wireless transmission of a partial image to the large screen display device 14B may be simultaneously performed. Moreover, in this case, partial image reproduction may be continuously performed without putting the large screen display device 14B in the standby state.

<Synchronization Processing>

Synchronization processing performed between the mobile display device 13 and the large screen display device 14 will be described with reference to FIGS. 18 to 21.

For example, in a pull-type distribution mechanism from a client such as the MPEG-DASH, synchronization information is periodically exchanged between a master that leads synchronization processing and a slave that performs synchronization processing subordinate to the master, and thereby, the content reproduction times are loosely synchronized (for example, within a predetermined time of about several seconds). For example, in the content distribution system 11, the mobile display device 13 serves as the master and the large screen display device 14 serves as the slave to perform synchronization processing. Note that a plurality of slaves can perform synchronization processing on one master.

Figure 18:
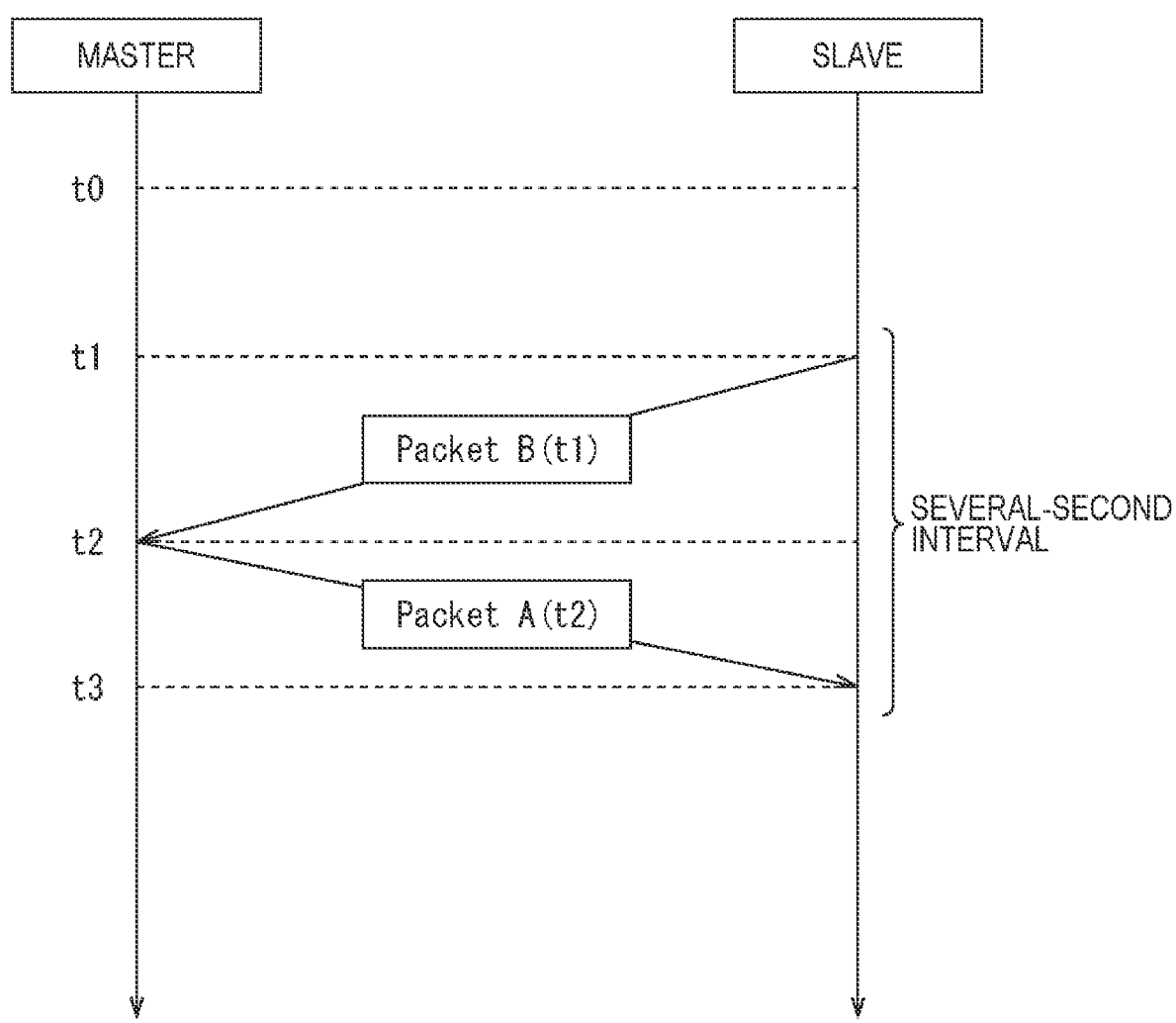
FIG. 18 is a diagram for explaining synchronization processing.

Then, as shown in FIG. 18, the synchronization information PacketB(t1) is transmitted from the slave to the master at time t1, the synchronization information PacketA(t1) is transmitted from the master to the slave at time t2, and the reproduction time is checked. Such checking is performed between the master and the slave at predetermined time intervals (for example, intervals of several seconds). Furthermore, the synchronization information includes time t indicating the time when the synchronization information is transmitted, reproduction reference time $T_{Play}$ at the time t, reference time speed $\Delta T_{Play}$ at the time t, and instruction Direction for speed change of the reproduction reference time from the master to the slave.

Figure 19:
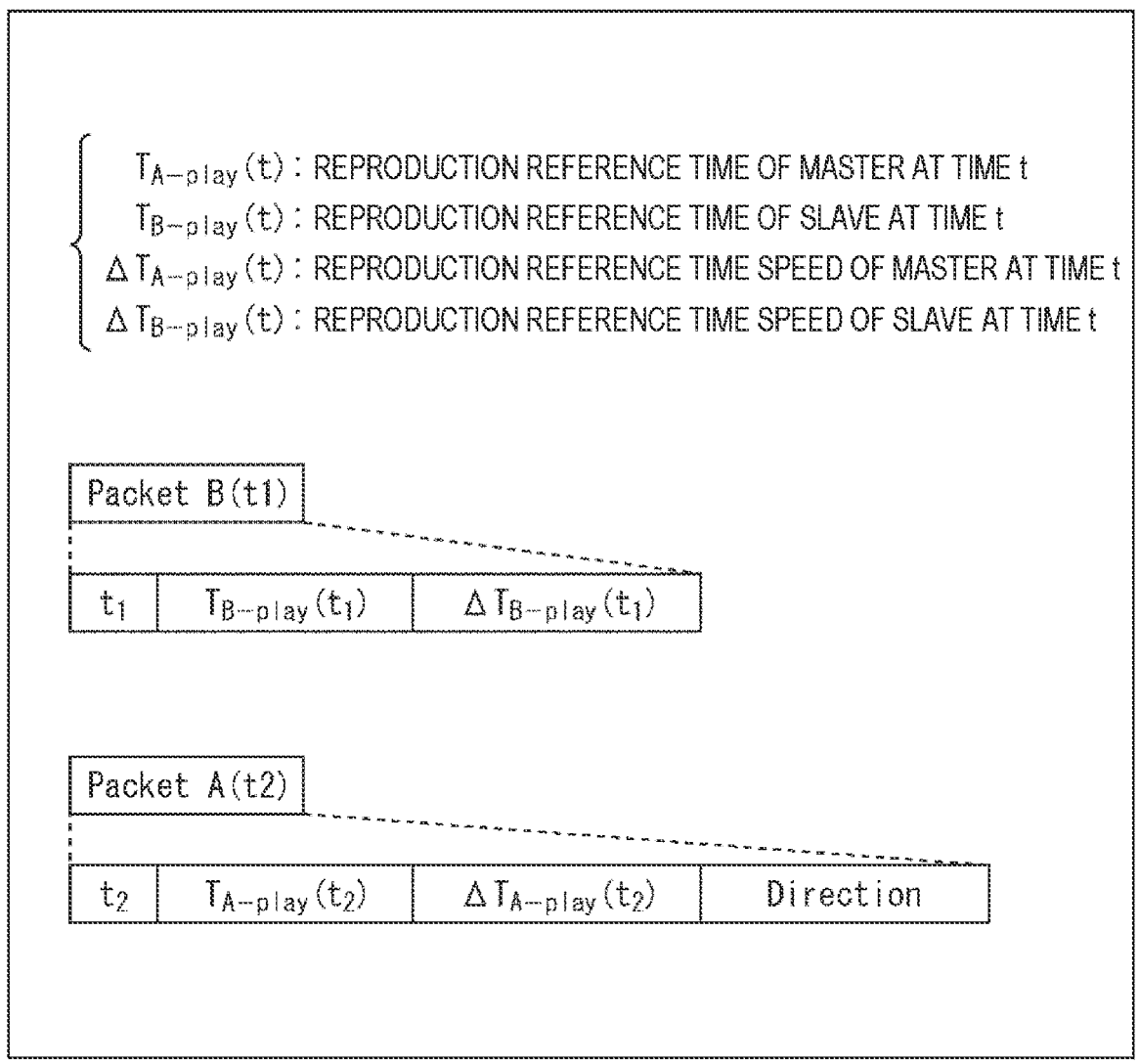
FIG. 19 is a diagram for explaining synchronization processing.

Furthermore, as shown in FIG. 19, in the description below, master reproduction reference time $T_{A\text{-}Play}$ at the time t, slave reproduction reference time $T_{B\text{-}Play}$ at the time t, master reproduction reference time speed $\Delta T_{A\text{-}Play}$ at the time t, and slave reproduction reference speed $\Delta T_{B\text{-}Play}$ at the time t are used.

Then, the synchronization information PacketB(t1) transmitted from the slave at time t1 includes the time t1, the slave reproduction reference time $T_{B\text{-}Play}(t1)$ at the time t1, and the slave reference time speed $\Delta T_{B\text{-}Play}(t1)$ at the time t1. Furthermore, the synchronization information PacketA(t2) transmitted from the master at time t2 includes the time t2, master reproduction reference time $T_{A\text{-}Play}(t2)$ at the time t2, master reference time speed $\Delta T_{A\text{-}Play}(t2)$ at the time t2, and an instruction Direction for speed change of the reproduction reference time from the master to the slave.

Figure 20:
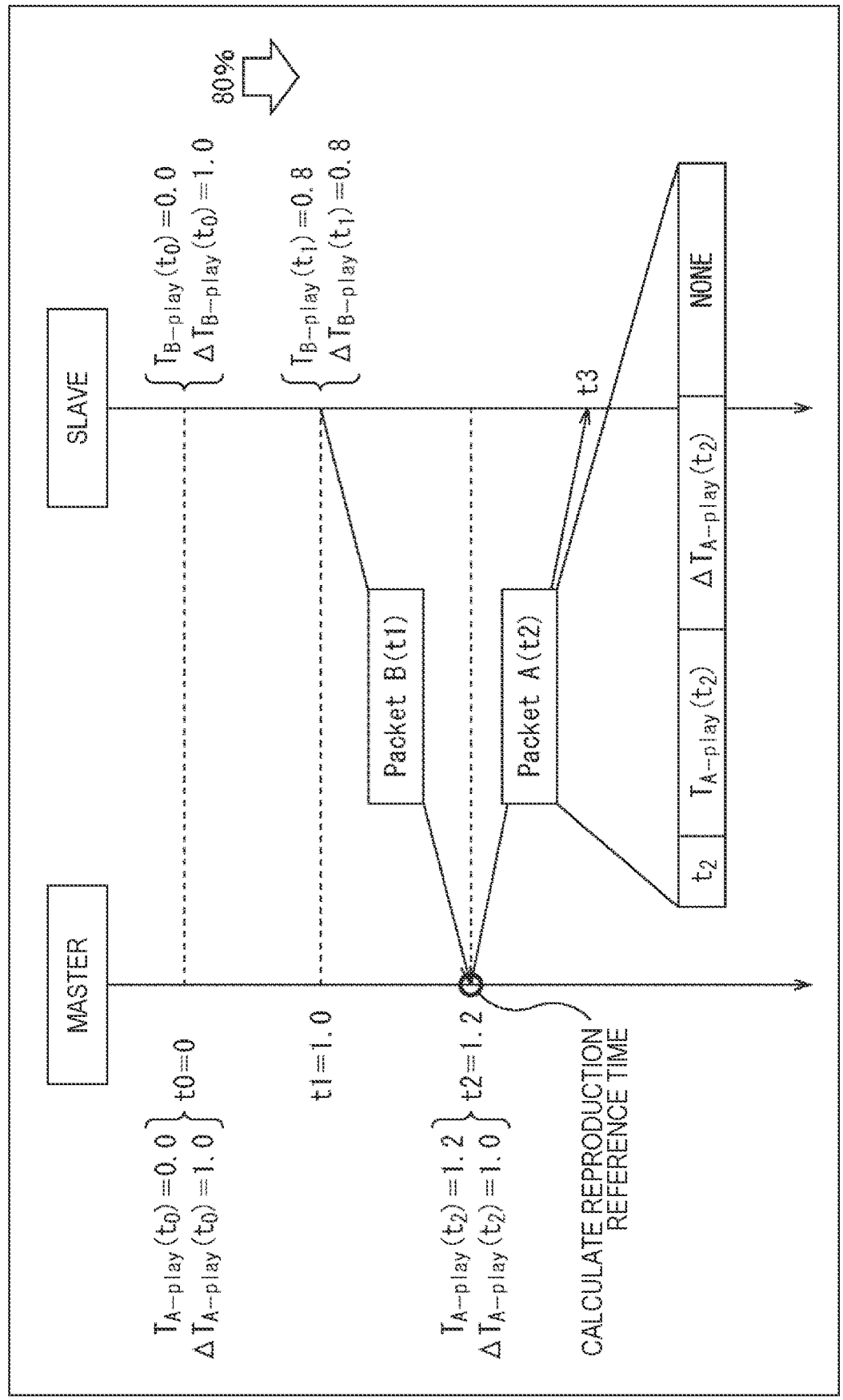
FIG. 20 is a diagram for explaining synchronization processing.

With reference to FIG. 20, the synchronization processing when a slight delay (for example, 80%) occurs in the reproduction time in the slave with respect to the reproduction time in the master will be described.

At this time, the reproduction reference time $T_{B\text{-}Play}(t1)$ of the synchronization information PacketB(t1) transmitted from the slave at the time t1 (=1.0) is 0.8 and the speed $\Delta T_{B\text{-}Play}(t1)$ is 0.8 according to the delay occurring at the slave reproduction time.

The master receives this synchronization information PacketB(t1) at the time t2 (=1.2) and calculates the slave reproduction reference time $T'_{B\text{-}Play}(t2)$ at the time t2 as shown in the Equation (1) below.

[Equation 1]

$$\Delta T'_{B-play}(t_2) = T_{B-play}(t_1) + \Delta T_{B-play}(t_1) \cdot (t_2 - t_1) = \\ 0.8 + 0.8 \cdot (1.2 - 0.8) = 1.12 < 1.2 \quad (1)$$

As a result, the master reproduction reference time $T_{A\text{-}Play}(t)$ advances too much, and therefore, as shown in the Equation (2) below, the master reduces the master reference time speed $\Delta T_{A\text{-}Play}(t)$ according to a coefficient α smaller than 1.0.

[Equation 2]

$$\Delta T_{A-play}(t) = \Delta T_{A-play}(t) \cdot \alpha (\alpha < 1.0) \quad (2)$$

As described above, in a case where the reproduction time on the slave side is delayed, in order to perform control of reducing the reproduction speed on the master side, the instruction Direction in the synchronization information PacketA(t2) transmitted from the master to the slave at the time t2 is NONE indicating that no instruction is given to the slave.

As described above, when there is a slight delay in the reproduction time of the slave, the reproduction speed on the master side is reduced, and the reproduction of the contents can be synchronized without controlling the reproduction speed of the slave.

Figure 21:
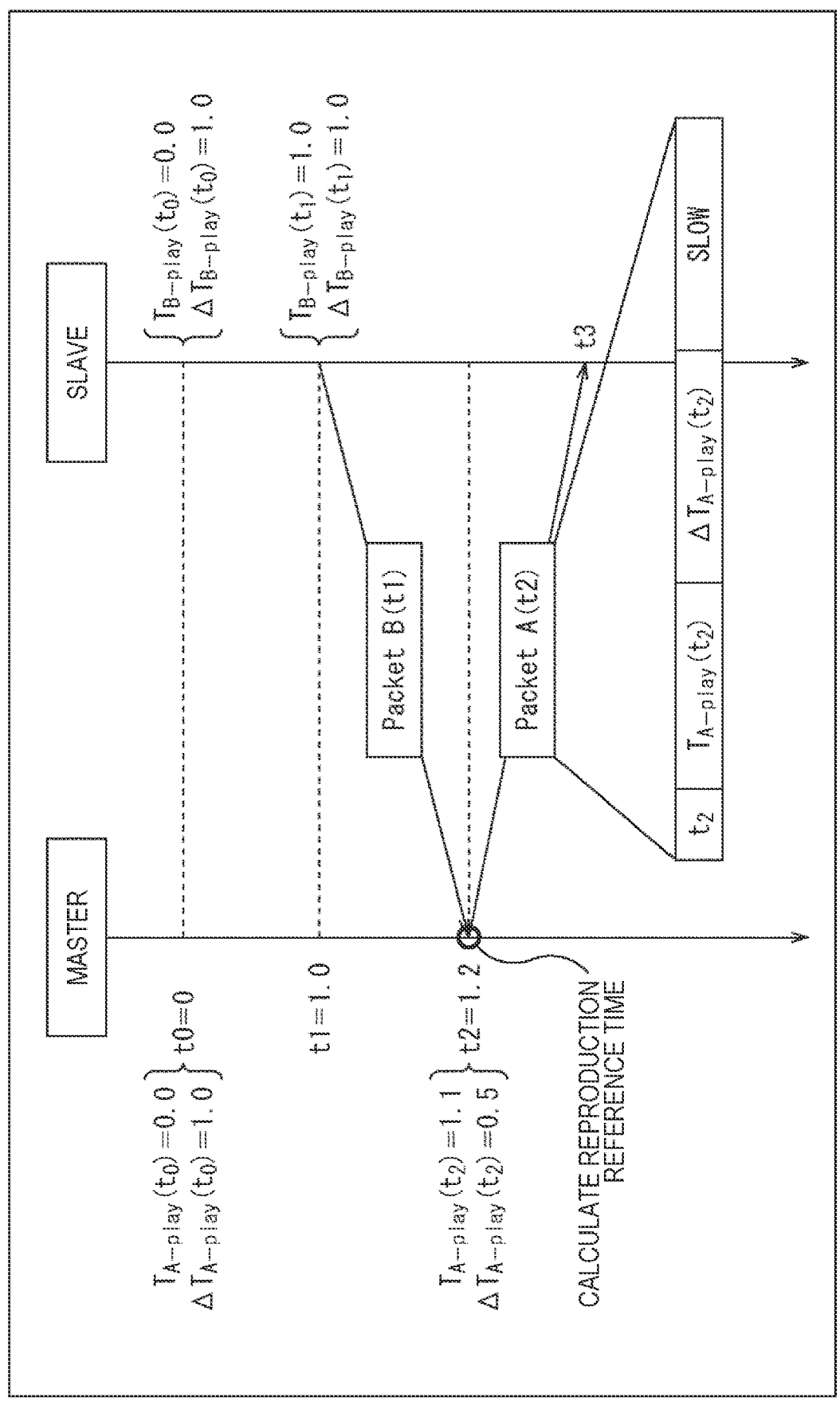
FIG. 21 is a diagram for explaining synchronization processing.

With reference to FIG. 21, synchronization processing will be described when there is a slight delay in the reproduction time in the master with respect to the reproduction time in the slave.

At this time, since there is no delay in the reproduction time of the slave, the reproduction reference time $T_{B-Play}(t1)$ of the synchronization information PacketB(t1) transmitted from the slave at the time t1 (=1.0) is 1.0 and the speed $\Delta T_{B-Play}(t1)$ is 1.0.

The master receives this synchronization information PacketB(t1) at the time t2 (=1.2) and calculates the slave reproduction reference time $T'_{B-Play}(t2)$ at the time t2 as shown in the Equation (3) below. At this time, the reproduction reference time $T_{A-Play}(t0)$ is 1.1 and the speed $\Delta T_{B-Play}(t1)$ is 0.5 according to the delay occurring at the reproduction time of the master.

[Equation 3]

$$\Delta T'_{B-play}(t_2) = T_{B-play}(t_1) + T_{B-play}(t_1) \cdot (t_2 - t_1) = \qquad (3)$$
$$0.8 + 0.8 \cdot (1.2 - 0.8) = 1.12 > 1.1$$

As a result, the slave reproduction reference time $T_{B-Play}$(t) advances too much, and therefore, as shown in the Equation (4) below, the master reduces the slave reference time speed $\Delta T_{B-Play}(t)$ according to a coefficient α smaller than 1.0. At this time, the master does not control the reproduction speed.

[Equation 4]

$$\Delta T_{B-play}(t) = \Delta T_{B-play}(t) \cdot \alpha(\alpha < 1.0) \qquad (4)$$

Then, the instruction Direction in the synchronization information PacketA(t2) transmitted from the master to the slave at the time t2 is SLOW indicating a deceleration instruction to the slave.

As described above, when there is a slight delay in the reproduction time of the master, the reproduction speed on the slave side is reduced, and the reproduction of the contents can be synchronized without controlling the reproduction speed of the master.

<Computer Configuration Example>

Next, the series of processing described above (information processing method) can be also executed by hardware or can be executed by software. In a case where a series of processing is executed by software, a program constituting the software is installed in a general computer or the like.

Figure 22:
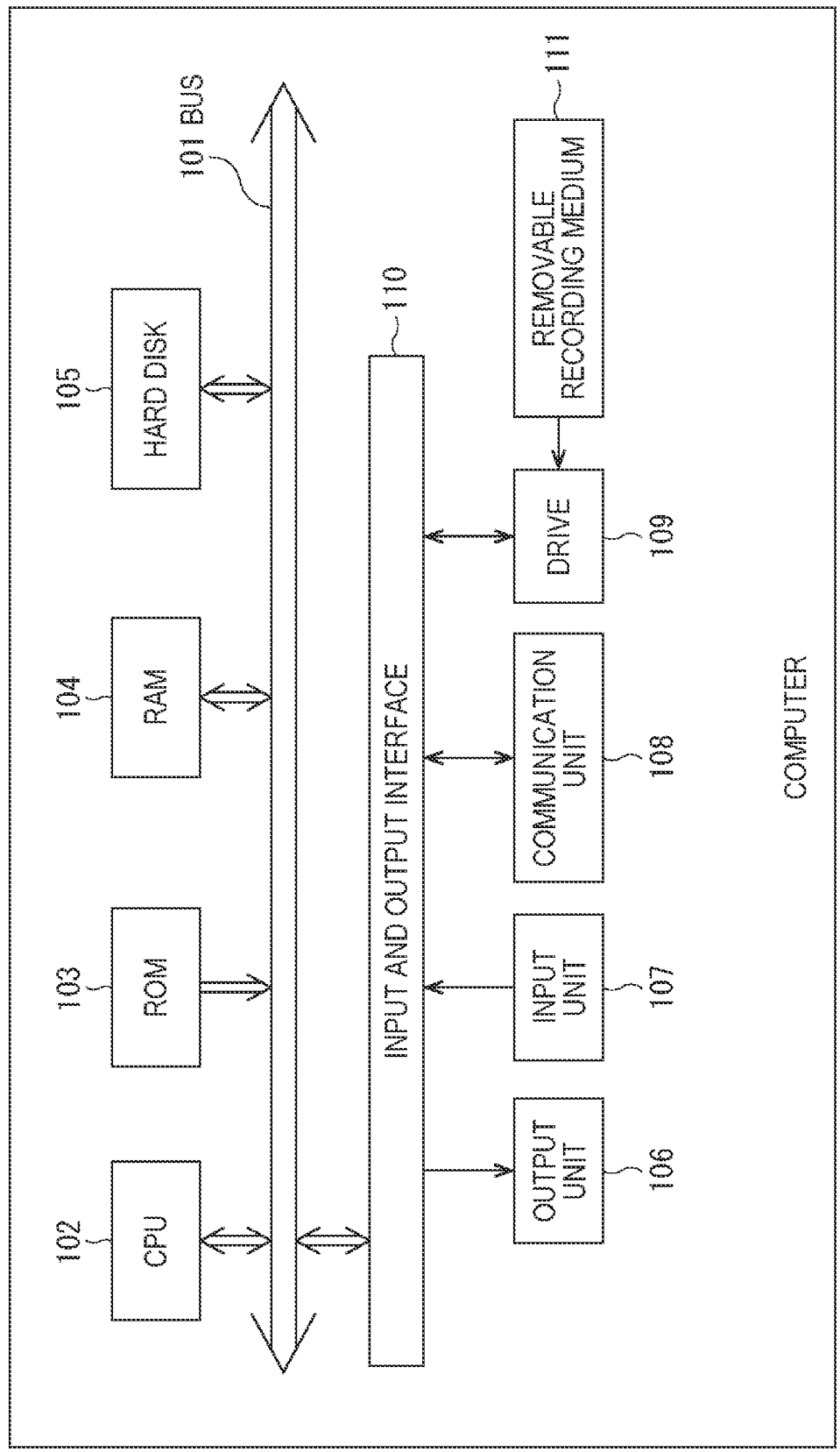
FIG. 22 is a block diagram showing a configuration example of a computer according to an embodiment to which the present technology is applied.

FIG. 22 is a block diagram showing a configuration example of an embodiment of a computer on which a program for executing the above-described series of processing is installed.

The program can be recorded in advance on a hard disk 105 or ROM 103 as a recording medium built in the computer.

Alternatively, the program can be stored (recorded) in a removable recording medium 111 driven by a drive 109. Such a removable recording medium 111 can be provided as so-called package software. Here, examples of the removable recording medium 111 include a flexible disk, a compact disc read only memory (CD-ROM), a magneto optical (MO) disk, a digital versatile disc (DVD), a magnetic disk, and a semiconductor memory.

Note that the program can be installed on the computer from the removable recording medium 111 as described above, or can be downloaded to the computer via a communication network or a broadcasting network and installed on the built-in hard disk 105. That is, for example, the program can be wirelessly transferred from a download site to a computer via an artificial satellite for digital satellite broadcasting, or can be transferred to the computer by wire via a network such as the local area network (LAN) or the Internet.

The computer has a built-in central processing unit (CPU) 102, and an input and output interface 110 is connected to the CPU 102 via the bus 101.

When a command is input by the user by operating the input unit 107 or the like via the input and output interface 110, the CPU 102 executes a program stored in the read only memory (ROM) 103 according to the command. Alternatively, the CPU 102 loads the program stored in the hard disk 105 into the random access memory (RAM) 104 and executes the program.

Therefore, the CPU 102 performs the processing according to the above-described flowchart or the processing performed according to the above-described block diagram configuration. Then, for example, the CPU 102 outputs the processing result from the output unit 106, transmits the processing result from the communication unit 108, or records the processing result on the hard disk 105, via the input and output interface 110 as necessary.

Note that the input unit 107 includes a keyboard, a mouse, a microphone, and the like. Furthermore, the output unit 106 includes a liquid crystal display (LCD), a speaker, or the like.

Here, in the present specification, processing performed by a computer according to a program does not necessarily need to be performed in a time series in the order described in the flowchart. That is, the processing performed by the computer according to the program also includes processing executed in parallel or individually (for example, parallel processing or processing by an object).

Furthermore, the program may be processed by one computer (processor) or processed by a plurality of computers in a distributed manner. Moreover, the program may be transferred to a distant computer and executed.

Moreover, in this specification, a system means a set of a plurality of constituent elements (devices, modules (parts), or the like), and it does not matter whether or not all constituent elements are in the same casing. Therefore, a plurality of devices that is housed in separate housings and is connected via a network, and one device in which a plurality of modules is housed in one housing are both systems.

Furthermore, for example, the configuration described as one device (or processing unit) may be divided and configured as a plurality of devices (or processing units). On the contrary, in the above, the configuration described as a plurality of devices (or processing units) may be integrated and configured as one device (or processing unit). Furthermore, configurations other than those described above, may be added to the configuration of each device (or each processing unit). Moreover, when the configuration and operation of the system as a whole are substantially the same, a part of the configuration of a certain device (or processing unit) may be included in the configuration of another device (or another processing unit).

Furthermore, for example, in the present technology, it is possible to adopt a configuration of cloud computing in which one function is shared by a plurality of devices via a network, and is collaboratively processed.

Furthermore, for example, the above-described program can be executed in any device. In that case, it is sufficient that the device has a necessary function (function block or the like) so that necessary information can be acquired.

Furthermore, for example, each step described in the above-described flowchart can be executed by one device or shared by a plurality of devices. Moreover, in a case where a plurality of processes is included in one step, a plurality of processes included in the one step can be executed by one device or shared and executed by a plurality of devices. In other words, a plurality of processes included in one step can be executed as a plurality of steps. On the contrary, the processes described as a plurality of steps can be collectively executed as one step.

Note that the program executed by the computer may be configured such that the processes of the steps for writing the program are executed in time series in the order described in this specification, or may be executed individually at a necessary timing such as in parallel or when the calls are made. That is, as long as no contradiction occurs, the processing of each step may be executed in an order different from the order described above. Moreover, the process of the step for writing the program may be executed in parallel with the process of another program, or may be executed in combination with the process of another program.

Note that the plurality of the present technologies described in the present specification can be implemented independently as a single unit unless a contradiction occurs. Of course, a plurality of arbitrary present technologies can be used in combination. For example, part or all of the present technology described in any of the embodiments can be implemented in combination with part or all of the present technology described in other embodiments. Furthermore, part or all of the present technology described above may be implemented in combination with other technology not described above.

Note that, in the present embodiment, the content has been described as an image, but the content is not limited to a moving image and may include a still image.

<Example of Configuration Combination>

Note that, the present technology can also adopt the following configuration.

(1)

A content distribution system including:

a distribution server that distributes content in which a plurality of high-definition partial images and a low-resolution entire image including the plurality of partial images as regions are hierarchically configured;

a first display device that displays the entire image, and displays the partial images in a selectable manner on the entire image, so that operation of selecting a predetermined partial image of the partial images is performed; and a second display device that displays the partial images distributed from the distribution server in high definition according to operation on the first display device.

(2)

The content distribution system according to (1) described above, in which the distribution server, correspondingly to a request for distribution of the predetermined partial image, reads the partial image according to the request from a content storage unit in which the content is stored, and distributes the partial image to the second display device.

(3)

The content distribution system according to (1) or (2) described above, further including a conversion server that converts an uncompressed entire image in which the entire image is stored in an uncompressed format into the partial image according to a request for distribution of the predetermined partial image, in which, in a case where the predetermined partial image is not stored in the content storage unit in which the content is stored, the distribution server requests the conversion server to convert the uncompressed entire image to the partial image, and distributes the predetermined partial image acquired according to that request to the second display device.

(4)

The content distribution system according to any of (1) to (3) described above, in which the first display device performs characteristic image processing on a region corresponding to a plurality of the partial image on the entire image, and displays a selection screen that has been subjected to image processing showing a selection state on selected one of the plurality of the partial image.

(5)

The content distribution system according to any of (1) to (4) described above, in which the first display device, according to operation of selecting the predetermined partial image, transmits direction and visual field selection information indicating a region of the partial image to the second display device, and the second display device transmits a request for distribution of the predetermined partial image to the distribution server on the basis of the direction and visual field selection information.

(6)

The content distribution system according to (5) described above, in which Media Presentation Description (MPD) of Moving Picture Experts Group Dynamic Adaptive Streaming over HTTP (MPEG-DASH) is used for the direction and visual field selection information.

(7)

The content distribution system according to any of (1) to (6) described above, in which the first display device and the second display device periodically exchange synchronization information for synchronizing reproduction time of the content within a predetermined time.

(8)

The content distribution system according to (7) described above, in which the synchronization information includes transmission time at which the synchronization information is transmitted, reproduction reference time at time of the transmission time, and reference time speed at time of the transmission time, and the synchronization information transmitted from one of the first display device and the second display device, which leads synchronization processing, further includes an instruction for a speed change of the reproduction reference time.

(9)

The content distribution system according to any of (1) to (8) described above, in which the first display device transmits a request for distribution of the predetermined partial image to the distribution server, receives the partial image distributed from the distribution server correspondingly to the request, generates compressed image sound obtained by compressing the partial image together with sound of the partial image, and transmits the compressed image sound to the second display device.

(10)

The content distribution system according to any of (1) to (9) described above, in which the first display device is a small portable mobile display device provided with a touch panel display, and the second display device is a large-sized large screen display device capable of displaying a high-definition image.

(11)

A content distribution method including, by a content distribution system that distributes content, distributing content in which a plurality of high-definition partial images and a low-resolution entire image including the plurality of partial images as regions are hierarchically configured, displaying the entire image, and displaying the partial images in a selectable manner on the entire image, so that operation of selecting a predetermined partial image of the partial images is performed, and displaying the partial images distributed according to the operation in high definition.

(12)

A program for causing a content distribution computer that distributes content to perform content distribution processing, the processing including distributing content in which a plurality of high-definition partial images and a low-resolution entire image including the plurality of partial images as regions are hierarchically configured, displaying the entire image, and displaying the partial images in a selectable manner on the entire image, so that operation of selecting a predetermined partial image of the partial images is performed, and displaying the partial images distributed according to the operation in high definition.

Note that the present embodiment is not limited to the above-described embodiments, and various modifications are possible without departing from the gist of the present disclosure. Furthermore, the effects described in the present specification are merely examples and are not intended to be limiting, and other effects may be provided.

REFERENCE SIGNS LIST

11 Content distribution system
12 Network
13 Mobile display device
14 Large screen display device
15 Distribution server
16 Content storage unit
17 Conversion server
18 Uncompressed entire image storage unit
21 Data reception unit
22 Data transmission unit
23 Reproduction control unit
24 Synchronous clock generation unit
25 Image reproduction unit
26 Selection screen generation unit
27 Selection screen control unit
28 Image sound compression unit
29 Wireless transmission unit
31 Data reception unit
32 Data transmission unit
33 Reproduction control unit
34 Synchronous clock generation unit
35 Image reproduction unit
36 Wireless reception unit
37 Extension unit
41 Data reception unit
42 Data transmission unit
43 Distribution control unit
44 Image selection unit
51 Data reception unit
52 Conversion control unit
53 Projection conversion unit
54 Image encoding unit
55 Multiplexing unit

The invention claimed is:

1. A content distribution system, comprising:
a distribution server configured to distribute content, wherein
the content includes an entire image,
the entire image includes a plurality of partial images, and
the entire image and the plurality of partial images are hierarchically layered;
a first display device configured to:
display the entire image;
display the plurality of partial images in a selectable manner on the entire image; and
execute an operation for selection of a specific partial image of the displayed plurality of partial images; and
a second display device, wherein
the second display device is configured to:
exchange synchronization information with the first display device, wherein the synchronization information includes:
a transmission time at which the synchronization information is transmitted;
a reproduction reference time at the transmission time;
an instruction for a speed change of reproduction of the content with respect to the reproduction reference time; and
a reference time speed at the transmission time, and
a synchronization process is executed for synchronization of the first display device and the second display device based on the synchronization information; and
display the selected specific partial image on the second display device in a resolution higher as compared to a resolution of the specific partial image displayed on the first display device in synchronization with the operation on the first display device, based on the execution of the synchronization process.

2. The content distribution system according to claim 1, further comprising a content storage unit configured to store the content, wherein
the distribution server is further configured to:
read the specific partial image, based on a request for distribution of the specific partial image from the content storage unit; and
distribute the specific partial image to the second display device.

3. The content distribution system according to claim 1, further comprising:
a content storage unit configured to store the content; and
a conversion server configured to convert an uncompressed entire image into the specific partial image according to a request for distribution of the specific partial image, wherein
the uncompressed entire image includes the entire image in an uncompressed format,
in a case where the specific partial image is not stored in the content storage unit, the distribution server is further configured to:
request the conversion server to convert the uncompressed entire image to the specific partial image; and
distribute the specific partial image acquired according to the request to the conversion server.

4. The content distribution system according to claim 1, wherein
the first display device is further configured to:
execute a characteristic image processing on a region corresponding to the plurality of partial images on the entire image; and
display a selection screen subjected to the characteristic image processing indicating a selection state on the selected specific partial image of the plurality of partial images.

5. The content distribution system according to claim 1, wherein
the first display device is further configured to transmit direction information and visual field selection information indicating a region of the specific partial image to the second display device, based on the operation of the selection of the specific partial image, and
the second display device is further configured to transmit a request for distribution of the specific partial image to the distribution server based on a basis of the direction information and the visual field selection information.

6. The content distribution system according to claim 5, wherein the first display device is further configured to generate the direction information and the visual field selection information in Media Presentation Description (MPD) format of Moving Picture Experts Group Dynamic Adaptive Streaming over HTTP (MPEG-DASH).

7. The content distribution system according to claim 1, wherein the first display device is further configured to:
transmit a request for distribution of the specific partial image to the distribution server;
receive the specific partial image corresponding to the transmitted request, wherein the received specific partial image is distributed from the distribution server;
generate a compressed image sound by compression of the specific partial image together with sound of the specific partial image; and
transmit the compressed image sound to the second display device.

8. The content distribution system according to claim 1, wherein
the first display device is a mobile display device including a touch panel display, and
the second display device is further configured to display a high-definition image, wherein a size of the first display device is larger than a size of the second display device.

9. A content distribution method, comprising:
distributing content including an entire image, wherein
the entire image includes a plurality of partial images, and
the entire image and the plurality of partial images are hierarchically layered,
displaying the entire image on a first display device;
displaying the plurality of partial images in a selectable manner on the entire image;
executing an operation on the first display device for selection of specific partial image of the displayed plurality of partial images;
exchanging, by a second display device, synchronization information with the first display device, wherein
the synchronization information includes:
a transmission time at which the synchronization information is transmitted;
a reproduction reference time at the transmission time;
an instruction for a speed change of reproduction of the content with respect to the reproduction reference time; and
a reference time speed at the transmission time, and
a synchronization process is executed for synchronization of the first display device and the second display device based on the synchronization information; and
displaying the selected specific partial image in a resolution higher as compared to a resolution of the specific partial image displayed on the first display device in synchronization with the operation on the first display device, based on the execution of the synchronization process.

10. A non-transitory computer-readable medium having stored thereon computer-executable instructions which, when executed by a computer, cause the computer to execute operations, the operations comprising:
distributing content including an entire image, wherein
the entire image includes a plurality of partial images, and
the entire image and the plurality of partial images are hierarchically layered;
displaying the entire image on a first display device;
displaying the plurality of partial images in a selectable manner on the entire image; and
executing an operation on the first display device for selection of a specific partial image of the displayed plurality of partial images;
exchanging, by a second display device, synchronization information with the first display device, wherein
the synchronization information includes:
a transmission time at which the synchronization information is transmitted;
a reproduction reference time at the transmission time;
an instruction for a speed change of reproduction of the content with respect to the reproduction reference time; and a reference time speed at the transmission time, and
a synchronization process is executed for synchronization of the first display device and the second display device based on the synchronization information; and displaying the selected specific partial image in a resolution higher as compared to a resolution of the specific partial image displayed on the first display device in synchronization with the operation on the first display device, based on the execution of the synchronization process.

\* \* \* \* \*